(12) United States Patent
Ghavamzadeh et al.

(10) Patent No.: US 10,311,467 B2
(45) Date of Patent: Jun. 4, 2019

(54) SELECTING DIGITAL ADVERTISING RECOMMENDATION POLICIES IN LIGHT OF RISK AND EXPECTED RETURN

(71) Applicant: Adobe Inc., San Jose, CA (US)

(72) Inventors: Mohammad Ghavamzadeh, San Jose, CA (US); Yinlam Chow, San Mateo, CA (US)

(73) Assignee: ADOBE INC., San Jose, CA (US)

( * ) Notice: Subject to any disclaimer, the term of this patent is extended or adjusted under 35 U.S.C. 154(b) by 914 days.

(21) Appl. No.: 14/667,338

(22) Filed: Mar. 24, 2015

(65) Prior Publication Data

US 2016/0283970 A1    Sep. 29, 2016

(51) Int. Cl.
*G06Q 30/02* (2012.01)
(52) U.S. Cl.
CPC ..... *G06Q 30/0244* (2013.01); *G06Q 30/0246* (2013.01); *G06Q 30/0269* (2013.01)
(58) Field of Classification Search
CPC .......... G06Q 30/0244; G06Q 30/0246; G06Q 30/0269
See application file for complete search history.

(56) References Cited

U.S. PATENT DOCUMENTS

| 2006/0200333 | A1* | 9/2006 | Dalal | G06F 17/5009 |
| | | | | 703/17 |
| 2008/0052219 | A1* | 2/2008 | Sandholm | G06Q 30/08 |
| | | | | 705/37 |

OTHER PUBLICATIONS

P. Artzner, F. Delbaen, J. Eber, and D. Heath. Coherent measures of risk. Journal of Mathematical Finance, 9(3):203-228, 1999.
O. Bardou, N. Frikha, and G. Pages. Computing VaR and CVaR using stochastic approximation and adaptive unconstrained importance sampling. Monte Carlo Methods and Applications, 15(3):173-210, 2009.
N. Bauerle and J. Ott. Markov decision processes with average-value-at-risk criteria. Mathematical Methods of Operations Research, 74(3):361-379, 2011.
D. Bertsekas. Nonlinear programming. Athena Scientific, 1999.
S. Bhatnagar. An actor-critic algorithm with function approximation for discounted cost constrained Markov decision processes. Systems & Control Letters, 59(12):760-766, 2010.
S. Bhatnagar, R. Sutton, M. Ghavamzadeh, and M. Lee. Incremental natural actor-Critic algorithms. In Proceedings of Advances in Neural Information Processing Systems 20, pp. 105-112, 2008.
S. Bhatnagar, R. Sutton, M. Ghavamzadeh, and M. Lee. Natural actor-critic algorithms. Automatica, 45 (11):2471-2482, 2009.

(Continued)

*Primary Examiner* — William A Brandenburg
(74) *Attorney, Agent, or Firm* — Keller Jolley Preece

(57) ABSTRACT

Systems and methods for selecting optimal policies that maximize expected return subject to given risk tolerance and confidence levels. In particular, methods and systems for selecting an optimal ad recommendation policy—based on user data, a set of ad recommendation policies, and risk thresholds—by sampling the user data and estimating gradients. The system or methods utilize the estimated gradients to select a good ad recommendation policy (an ad recommendation policy with high expected return) subject to the risk tolerance and confidence levels. To assist in selecting a risk-sensitive ad recommendation policy, a gradient-based algorithm is disclosed to find a near-optimal policy for conditional-value-at-risk (CVaR) risk-sensitive optimization.

20 Claims, 10 Drawing Sheets

(56) References Cited

OTHER PUBLICATIONS

S. Bhatnagar, H. Prasad, and L.A. Prashanth. Stochastic Recursive Algorithms for Optimization, vol. 434. Springer, 2013.

K. Boda and J. Filar. Time consistent dynamic risk measures. Mathematical Methods of Operations Research, 63(1):169-186, 2006.

V. Borkar. A sensitivity formula for the risk-sensitive cost and the actor-critic algorithm. Systems & Control Letters, 44:339-346, 2001.

V. Borkar. Q-learning for risk-sensitive control. Mathematics of Operations Research, 27:294-311, 2002.

V. Borkar and R. Jain. Risk-constrained Markov decision processes. IEEE Transaction on Automatic Control, 2014.

Y. Chow and M. Ghavamzadeh. Algorithms for CVaR optimization in MDPs. arXiv:1406.3339, 2014.

J. Filar, L. Kallenberg, and H. Lee. Variance-penalized Markov decision processes. Mathematics of Operations Research, 14(1):147-161, 1989.

J. Filar, D. Krass, and K. Ross. Percentile performance criteria for limiting average Markov decision processes. IEEE Transaction of Automatic Control, 40(1):2-10, 1995.

R. Howard and J. Matheson. Risk sensitive Markov decision processes. Management Science, 18(7): 356-369, 1972.

Prashanth L.A. and M. Ghavamzadeh. Actor-critic algorithms for risk-sensitive MDPs. In Proceedings of Advances in Neural Information Processing Systems 26, pp. 252-260, 2013.

H. Markowitz. Portfolio Selection: Efficient Diversification of Investment. John Wiley and Sons, 1959.

T. Morimura, M. Sugiyama, M. Kashima, H. Hachiya, and T. Tanaka. Nonparametric return distribution approximation for reinforcement learning. In Proceedings of the 27th International Conference on Machine Learning, pp. 799-806, 2010.

J. Ott. A Markov Decision Model for a Surveillance Application and Risk-Sensitive Markov Decision Processes. PhD thesis, Karlsruhe Institute of Technology, 2010.

J. Peters, S. Vijayakumar, and S. Schaal. Natural actor-critic. In Proceedings of the Sixteenth European Conference on Machine Learning, pp. 280-291, 2005.

M. Petrik and D. Subramanian. An approximate solution method for large risk-averse Markov decision processes. In Proceedings of the 28th International Conference on Uncertainty in Artificial Intelligence, 2012.

R. Rockafellar and S. Uryasev. Conditional value-at-risk for general loss distributions. Journal of Banking and Finance, 2:s1-41, 2000.

R. Rockafellar and S. Uryasev. Optimization of conditional value-at-risk. Journal of Risk, 26:1443-1471, 2002.

M. Sobel. The variance of discounted Markov decision processes. Applied Probability, pp. 794-802, 1982.

J. Spall. Multivariate stochastic approximation using a simultaneous perturbation gradient approximation. IEEE Transactions on Automatic Control, 37(3):332-341, 1992.

A. Tamar, D. Di Castro, and S. Mannor. Policy gradients with variance related risk criteria. In Proceedings of the Twenty-Ninth International Conference on Machine Learning, pp. 387-396, 2012.

A. Tamar, Y. Glassner, and S. Mannor. Policy gradients beyond expectations: Conditional value-at-risk. arXiv:1404.3862v1, 2014.

* cited by examiner

SELECTING DIGITAL ADVERTISING RECOMMENDATION POLICIES IN LIGHT OF RISK AND EXPECTED RETURN

BACKGROUND

1. Technical Field

One or more embodiments of the present disclosure relate generally to selecting, altering, replacing, or policies. More specifically, one or more embodiments of the present disclosure relate to systems and methods for selecting advertising recommendation policies in light of risk tolerance.

2. Background and Relevant Art

Product marketers commonly seek to target advertisements to the particular individual or group of consumers viewing the advertisement. The more a marketer can target advertising to consumers' unique characteristics, the more likely consumers will have interest in, and purchase, the pertinent products. In today's digital economy, marketers can increasingly tailor their advertisements based on digital information regarding potential customers and interact with them on an individual basis. This is particularly true with regard to advertising campaigns on personal computers, hand-held devices, smartphones, tablets, or web-enabled devices, where a marketer can gather and analyze digital information regarding the consumer and uniquely tailor advertisements to each user or device, on demand.

Accordingly, many businesses commonly gather and statistically analyze data and then adopt advertising policy programs that select advertising content based on discoverable characteristics of target consumers. Such advertising policy programs commonly select the "optimal" content for a consumer or group of consumers using a risk-neutral approach: that is, the analysis for adopting advertising policies maximizes the expected average return without taking into account the variation, or risk, associated with adopting any given policy.

While this approach tends to maximize value over an infinite time horizon, it may overlook problems that arise in risk-sensitive applications, i.e., business applications that cannot sustain large-scale variability. Thus, if a business or marketer cannot sustain wide variability—such as businesses with a lack of liquid assets or a marketer with sensitive business clients—a conventional risk-neutral approach may lead to catastrophic business results (i.e., an unsustainable loss of revenue in the short term).

In the past, particularly with print advertising, it has often been sufficient to select advertisement recommendation policies in a manner that maximizes life-time expected return without regard to risk. Given the effort and time needed to alter or replace traditional print advertising, it has typically been impractical to account for potential short-term losses. Thus, advertisers have focused policies that are projected to provide the most revenue long-term.

The advances in digital marketing and advertising allow for on demand altering and replacing of advertising recommendation policies and advertisement campaigns. In the current digital advertising realm, a website can go viral or bust in relatively short periods of time. Given how web traffic and clicks can provide revenue, changes in website design or ad recommendation policy can have dire affects if the bad policy choices are made.

That said, the nature of advertising information generally makes it difficult to analyze advertising policies in light of risk. In particular, the stochastic nature of website visitor behavior can mean the precise dynamic interaction between variables is typically unknown even though marketers often have access to data regarding advertising content, customer background, and customer decisions. Indeed, determining a precise model describing the complex interaction between customer background information, advertising content, and consumer decisions is generally impossible, if not cost-prohibitive, to develop. Moreover, conventionally, techniques do not account for variability and risk-tolerance when optimizing lifetime value in advertising recommendation policies or other complex decision-making scenarios.

These and other problems exist with regard to selecting, switching, and modifying digital ad recommendation policies.

BRIEF SUMMARY

Embodiments of the present disclosure provide benefits and/or solve one or more of the foregoing or other problems in the art with systems and methods that use a new stochastic optimization theory to select a digital advertising recommendation policy that seeks to maximize value in light of risk sensitivity. In particular, in one or more embodiments, the systems and methods identify an ad recommendation policy that optimizes expected lifetime value within the parameters of a selected risk threshold. In order to assist a user in identifying a more optimal ad recommendation policy in light of applicable risk, in one or more embodiments, systems and methods use a risk-tolerance value and confidence level, a set of user data indicating prior consumer behavior in relation to advertising, and a set of ad recommendation policies to select an optimal policy. Although the precise dynamic interaction among the pertinent variables may not be known, the systems and methods estimate gradients by sampling the set of user data and applying it to the current policy. The systems and methods then utilize the gradients to point toward parameters of an ad recommendation policy that falls within the risk-tolerance value and confidence level.

The systems and methods disclosed herein allow a user to identify an ad recommendation policy that tends to optimize the expected return value while staying within a user-defined measure of risk. Thus, one or more embodiments enable a user in a risk-sensitive environment to minimize the risk of adverse business outcomes that may result from optimizing the mean return value without consideration of variability. Furthermore, the systems and methods disclosed herein can operate through reinforcement learning techniques using historical data sampling, without a need for defined dynamic interaction amongst the variables.

Additional features and advantages of exemplary embodiments of the present disclosure will be set forth in the description which follows, and in part will be obvious from the description, or may be learned by the practice of such exemplary embodiments. The features and advantages of such embodiments may be realized and obtained by means of the instruments and combinations particularly pointed out in the appended claims. These and other features will become more fully apparent from the following description and appended claims, or may be learned by the practice of such exemplary embodiments as set forth hereinafter. The foregoing summary is not an extensive overview, and it is not intended to identify key elements or indicate a scope.

Rather the foregoing summary identifies aspects of embodiments as a prelude to the detailed description presented below.

BRIEF DESCRIPTION OF THE DRAWINGS

In order to describe the manner in which the above recited and other advantages and features of the invention can be obtained, a more particular description of the invention briefly described above will be rendered by reference to specific embodiments thereof that are illustrated in the appended drawings. It should be noted that the figures are not drawn to scale, and that elements of similar structure or function are generally represented by like reference numerals for illustrative purposes throughout the figures. Understanding that these drawings depict only typical embodiments of the invention and are not therefore to be considered to be limiting of its scope, the invention will be described and explained with additional specificity and detail through the use of the accompanying drawings in which.

DETAILED DESCRIPTION

Figure 1:
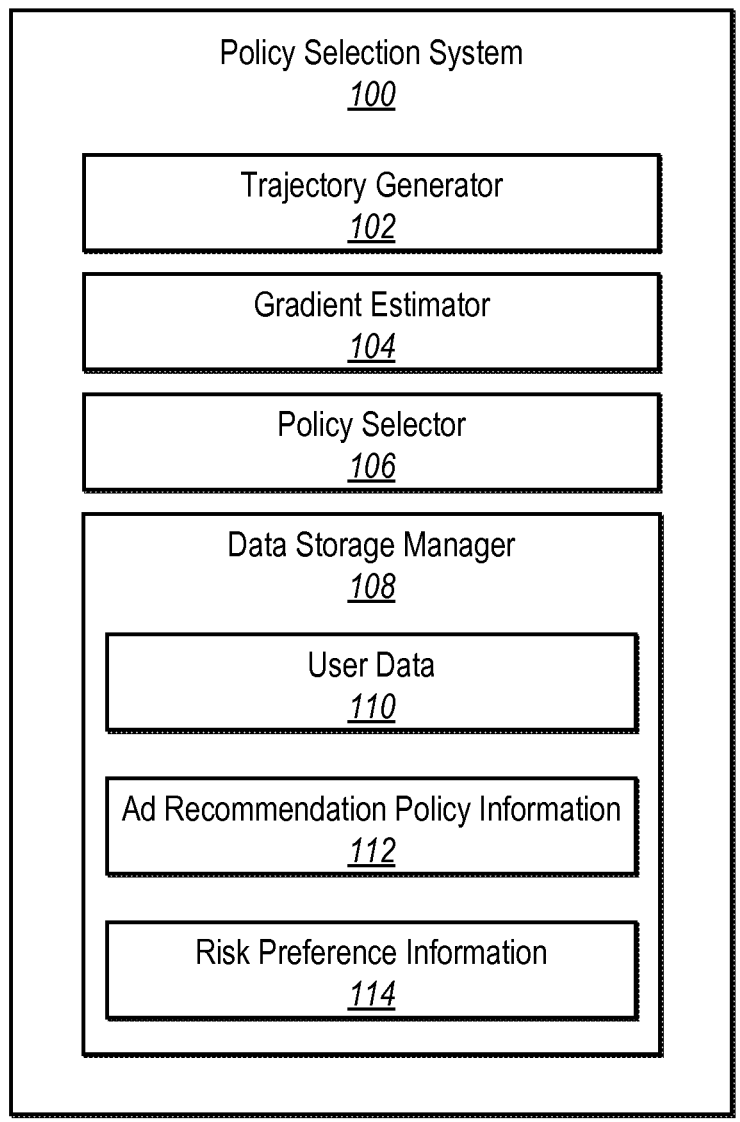
FIG. 1 illustrates a schematic diagram of a policy selection system in accordance with one or more embodiments.

One or more embodiments of the present disclosure include a policy selection system that uses stochastic optimization to select near optimal policies in light of risk. In particular, in one or more embodiments, the policy selection system allows the user to account for risk in selecting, changing, or altering an ad recommendation policy. Based on an identified acceptable level of risk, the policy selection system assists the user in identifying an ad recommendation policy that increases or optimizes expected return within given the acceptable level of risk.

Because the precise interaction between variables in selecting ad recommendation policies is unknown, the policy selection system utilizes reinforcement-learning techniques based on prior user data. In one or more embodiments, the policy selection system receives a risk-tolerance value and a confidence level, prior user data, and ad recommendation policies. The system estimates gradients of selection parameters by sampling the set of user data and applying the data to the current ad recommendation policy. The policy selection system utilizes these gradients to update the selection parameters and repeat the processes of estimating gradients using the updated selection parameters. The policy selection system repeats this process until the selection parameters converge, indicating an optimal ad recommendation policy that falls within the applicable risk-tolerance value and the confidence level.

The disclosed systems and methods allow a user to select an ad recommendation policy that tends to maximize expected returns while staying within a user-defined tolerance for risk. Thus, a user in risk-sensitive applications can state, to a selected confidence level, that the selected policy will remain within a certain range of results. This allows the user to reduce or minimize the risk of impermissible variance that may come from simply optimizing mean performance. Thus, one or more embodiments of the present disclosure, allow a user to control, within a selected confidence level, the amount of risk in expected results without unnecessarily sacrificing lifetime value.

For example, suppose that each trajectory is a weeklong company revenue data from ad recommendations. If a conventional ad recommendation policy selection is used that maximizes revenue without taking risk into account, although the average expected revenue is maximized, there might be weeks where the revenue drastically falls and causes panic in the company. On the other hand, the policy selection system can help ensure that a risk constraint is satisfied. For example, the policy selection system can select an ad recommendation policy that increases expected revenue while also helping ensure that the company's revenue stays above a minimum pre-specified threshold. In addition to helping avoid the deployment of risky policies, the policy selection system can give an ad manager the ability to shape revenue distributions and risk profiles.

To optimize lifetime value in light of risk, in one or more embodiments, the policy selection system can utilize a policy gradient algorithm. Specifically, the policy selection system can employ a policy gradient algorithm for mean-conditional value at risk optimization. It will be appreciated that conditional value at risk (CVaR) is a measure of the mean of the α-tail distribution—a variance measure that addresses some shortcomings of well-known variance-related risk measures. One or more embodiments employ reinforcement learning techniques through CVaR optimization in infinite horizon Markov decision processes (MDPs) as applied to large-scale digital problems, such as selection of an ad recommendation policy. Furthermore, embodiments of the present disclosure can operate in scenarios involving both continuous and discrete loss distributions.

In particular, the policy selection system can use a policy gradient algorithm for mean-conditional value at risk optimization by estimating gradients of the applicable risk-sensitive function. This approach uses gradient estimations that are used to update policy parameters until arriving at a risk-sensitive optimal policy. For example, one or more embodiments estimate gradients with regard to three selection parameters. Specifically, one gradient estimate directed to one or more risk parameters, one gradient estimate directed to one or more ad recommendation policy parameters, and one gradient directed to one or more constraint parameters (e.g., Lagrangian parameters).

To inform the system without knowing the precise system dynamics in advance, embodiments estimate the gradients in the policy gradient algorithm by calculating one or more trajectories. These trajectories provide the policy selection system with information regarding how the policy may operate in practice, thus providing a more accurate gradient estimation for the applicable risk function. Specifically, the system or methods generate one or more trajectories based on samples from user data, allowing the policy selection system to identify a more optimal ad recommendation policy that falls within applicable risk-thresholds without knowing the exact dynamic interaction amongst the variables. Using Monte Carlo methods or other reinforcement learning techniques, the one or more trajectories direct the gradient estimates to update the parameters toward a more optimal ad recommendation policy. Moreover, one or more embodiments update the applicable parameters after observing several trajectories.

Thus, the policy selection system may use user data to calculate one or more trajectories. The policy selection system can use the trajectories to provide direction for gradient estimates. The policy selection system can then use the gradient estimates to update policy parameters. The policy selection system can repeat this process until the algorithm converges toward a new ad recommendation policy within the risk-tolerance value and confidence level.

To help converge on an ad recommendation policy efficiently, in one or more embodiments the trajectories are used to estimate the gradients on differing time-scales. For example, the policy selection system can estimate the risk tolerance parameters on the fastest time-scale, the ad recommendation policy parameters on an intermediate time scale, and the Lagrangian parameters on a slowest time-scale. This assists the policy gradient algorithm in converging efficiently on an ad recommendation policy subject to the applicable risk and system constraints.

Furthermore, one or more embodiments employ projection operators to help ensure convergence of the policy gradient algorithm. The projection operators project vectors onto the gradient estimates. This helps to ensure that the policy gradient algorithm converges to an optimal set of ad recommendation policies. As outlined below, using ordinary differential equations (ODE), these algorithms asymptomatically converge to locally risk-sensitive optimal policies.

As used herein, the term "ad recommendation policy" refers to a set of one or more rules or parameters that recommends advertising content to serve for a given set of conditions. For example, an ad recommendation policy can select or identify an advertisement to present on a webpage (or other marketing medium) when a user with a given set of characteristics/user profile information visits the webpage. The characteristics/user profile information can include any type of information, including information regarding location, gender, age, interests, previous purchases, previous searches, and so forth. An advertisement can comprise advertising content. Specifically, advertising content can include advertisements directed or served to any number of marketing mediums, including, but not limited to, websites, native applications, handheld devices, personal computers, tablets, cellphones, smartphones, smart-watches, electronic readers, or other device or medium. Moreover, advertising content includes any advertising material or component thereof, including, but not limited to, images, colors, sound, text, and video, in isolation or in combination.

An ad recommendation policy may recommend advertising content based on one or more pieces of information in isolation or in conjunction with other pieces of information regarding a user. For example, an ad recommendation policy can recommend advertising based on age, gender, location, and previous purchases, in isolation or in combination. In particular, an ad recommendation policy can include a rule that recommends an advertisement for a particular toy when a child visits a website and recommends an advertisement for a particular automobile when an adult visits the website. Similarly, the more general term "policy" as used herein, refers to a set of rules that recommends a decision in response to a given set of data.

As used herein, the term "optimized ad recommendation policy" refers to an ad recommendation policy selected based on a projection that advertisements selected based on the optimized ad recommendation policy will lead to a high or optimized expected number of clicks, conversion, revenue, or other metric. As used herein, the term "optimized ad recommendation policy" does not necessarily mean the most optimal policy, but rather one that is projected to be optimal. Furthermore, an optimized ad recommendation policy can further be subject to one or more constraints. For example, an optimized ad recommendation policy can be "optimal" for a given time period, a given website, a given geographic location, a given risk tolerance, etc.

As used herein, the term "risk-tolerance value" or "loss-tolerance value" refers to a measure of permissible variance in a desired result. The statistical meaning of the term "risk-tolerance value" or "loss-tolerance value" is often expressed as the Greek letter "$\beta$." The risk-tolerance value, as initially received, can take any number of forms, including a statistical conditional-value-at-risk measure or a minimum result in performance. For example, consider an advertising business that has historically lost clients upon selecting an advertising recommendation policy that falls below a 0.1% click rate. Even if the advertising business selects an advertising recommendation policy that optimizes the number of clicks, the advertising business may not have clients if the click rate drops below 0.1%. Accordingly, the advertising business can adopt a "risk-tolerance value" of a 0.1% click rate, which would allow the user to control the risk of losing clients as a result of excessive variance.

As used herein, the term "confidence level" refers to a measure of the probability that actual results will remain within the threshold described by the risk-tolerance value. The confidence level is generally described as a percent probability that the desired results will occur. The statistical meaning of the term "confidence level" is often expressed as the Greek letter "$\alpha$." A user that needs to be confident that risk, or variance, will not exceed a certain level should select a correspondingly high confidence level. For example, consider an advertising business that sets a "risk-tolerance value" of a 0.1% click rate. If the risk of losing clients is particularly high when the click-rate drops below 0.1%, the advertising business may wish to ensure, with 95% probability, that the click-rate will not drop below 0.1%. In such circumstances, the confidence level would be 95%.

As used herein, the terms "user data" or "sample data" refers to data of past policy performance. For example, user data can comprise data representing prior user behavior in relation to a set of conditions upon which a policy is based. In particular, user data can represent user responses to the same advertisement; to a variety of different advertisements;

to advertisements using different features; to similar advertisements in different media forms; to similar advertising with different images or actors; and so forth. The user data can represent a variety of consumer behaviors in relation to advertising, such as, clicks, non-clicks, views, non-views, touches, non-touches, likes, dislikes, purchases, non-purchases, selections, non-selections, and so forth. The user data can also represent many types of consumer information, such as, gender, location, age, device-type, ethnicity, pageviews, purchases, and so forth. For example, the user data can indicate users that visited a particular website, characteristics about the users, advertising content presented to the users, and whether that consumer clicked on the advertising content.

As used herein, the term "policy parameter" refers to the set of measurable factors that define the scope of the one or more policies. Similarly, the term "risk parameter" refers to the set of measurable factors that define variance. Moreover, the term "constraint parameter" refers to a set of factors that define the strategy conditions for optimizing the constrained problem. In other words, the constraint parameters are conditions for a minimum or maximum value to exist, and hence, for identifying an optimal expected result. Although these parameters can take a variety of forms, in one or more embodiments, these parameters are addressed below in the discussion of θ (policy parameter); ν (risk parameter); and λ (constraint parameter).

FIG. 1 illustrates a schematic diagram illustrating an example embodiment of a policy selection system 100. As shown, the policy selection system 100 can include various components for performing the processes and features described herein. For example, as shown in FIG. 1, the policy selection system 100 may include, but is not limited to, a trajectory generator 102, a gradient estimator 104, a policy selector 106, and a data storage manager 108. The data storage manager 108 may include, but is not limited to, user data 110 and recommendation policy information 112, and risk preference information 114. Although the disclosure herein describes the components 102-108 as separate components, as illustrated in FIG. 1, any of the components 102-108 may be combined into fewer components, such as into a single facility or module, or divided into more components as may serve one or more embodiments.

It will be recognized that any of components 102-108 may be combined into fewer components, such as into a single component, or divided into more components as may serve a particular embodiment. The components 102-108 can comprise software, hardware, or both. For example, the components 102-108 can comprise one or more instructions stored on a computer-readable storage medium and executable by processors of one or more computing devices, such as a client device or server device. When executed by the one or more processors, the computer-executable instructions of the policy selection system 100 can cause the computing device(s) to perform the policy selection methods described herein. Alternatively, the components 102-108 can comprise hardware, such as a special purpose processing device to perform a certain function or group of functions. Additionally or alternatively, the components 102-108 can comprise a combination of computer-executable instructions and hardware.

One or more embodiments can partially implement the policy selection system 100 as a native application installed on a client-computing device. For example, the policy selection system 100 may include a mobile application that installs and runs on a mobile device, such as a smart phone or a tablet. Alternatively, the policy selection system 100 can include a personal computer application, widget, or other form of a native computer program. Alternatively, the policy selection system 100 may be a remote application that a client-computing device accesses. For example, the policy selection system 100 may include a web application that is executed within a web browser of a client-computing device. Furthermore, the components 102-108 of the policy selection system 100 may, for example, be implemented as a stand-alone application, as a module of an application, as a plug-in for applications including marketing functions, as a library function or functions that may be called by other applications such as digital marketing applications, and/or as a cloud-computing model. Alternatively or additionally, the components of the policy selection system 100 may be implemented in any policy recommendation application, including but not limited to ADOBE Test&Target 1:1. "ADOBE," "Target," and "Test&Target 1:1" are either registered trademarks or trademarks of Adobe Systems Incorporated in the United States and/or other countries.

As mentioned above, the policy selection system 100 can use optimize a conditional value-at risk for a Markov decision (see equations 1-4 below) process using a trajectory-based policy gradient algorithm (see algorithm 1 below). In particular, the trajectory generator 102 can generate a set of trajectories for a policy parameter, a risk parameter, and a constraint parameter. In particular, the trajectory generator 102 can generate one or more trajectories of a given parameter of the policy parameter, the risk parameter, or the constraint parameter by sampling the set of user data.

Once the trajectory generator 102, generates the trajectories for each of the policy parameter, risk parameter, and the constraint parameter, the gradient estimator 104 can use the trajectories to estimate the gradients for the parameters. In particular, the gradient estimator 104 can use the trajectories to estimate the gradients in equations 8-10 included below. The gradient estimator 104 can then use the estimated gradients to update the policy parameter, the risk parameter, and the constraint parameter.

The trajectory generator 102 can then generate another set of trajectories for the updated policy parameter, the updated risk parameter, and the updated constraint parameter. In particular, the trajectory generator 102 can generate one or more trajectories of a given updated parameter by sampling the set of user data. In turn, the gradient estimator 104 can then use the updated trajectories to estimate the gradients for the updated parameters. In particular, the gradient estimator 104 can use the updated trajectories to estimate the gradients in equations 8-10 included below. The gradient estimator 104 can then use the estimated gradients to again update the policy parameter, the risk parameter, and the constraint parameter. This process can be repeated to simultaneously converge the policy parameter, the risk parameter, and the constraint parameter to identify an optimized policy that is subject to a risk-tolerance value within a confidence level.

As part of simultaneously converging the policy parameter, the risk parameter, and the constraint parameter, the trajectory generator 102 can converge the risk parameter at a first time scale, converge the policy parameter at a second time scale, and converge the constraint parameter at a third time scale. The first time scale can be faster than the second time scale and the second time scale can be faster than the third time scale.

The policy selection system can also include a policy selector 106 to facilitate the selection of an ad recommendation policy. In particular, the policy selector 106 can select an ad recommendation policy in light of the updated policy parameters generated by the gradients estimated by the gradient estimator 104. In one or more embodiments the policy selector 106 identifies ad recommendation policies in accordance with generated policy parameters. Depending on the embodiment, the policy selector 106 can select ad recommendation policies from the ad policy recommendation information 112 (or some other source), can combine ad recommendation policies from the ad policy recommendation information 112 (or some other source), or can create ad recommendation policies or combinations of ad recommendation policies. One or more alternative embodiments may not include a policy selector 104; rather the policy selection can occur within one or more alternative components or may occur in conjunction with estimation of the gradients.

As described above, the policy selection system 100 can include a data storage manager 108 to facilitate storage of information for the policy selection system 100. In particular, the data storage manager 108 can store information used by one or more of the components of the data generation system 100 to facilitate the performance of various operations associated with the policy selection system 100. In one or more embodiments as shown in FIG. 1, the data storage manager 108 maintains user data 110, ad recommendation policy information 112, and risk preference information 114. The data storage manager 108 may also store any additional or alternative information corresponding to the operation of the policy selection system 100. The data storage manager can maintain additional or alternative data as may serve a particular implementation. The data storage manager may communicate with any component within the data generation system 100 to obtain or share information for selecting an ad recommendation policy with the policy selection system 100. In one or more embodiments, the data storage manager includes one or more servers on which various types of data are stored. For example, the data storage manager may include or may be implemented in a data storage environment.

In one or more embodiments, the user data 110 can include one or more samples of consumer behavior in relation to advertising. In particular, the user data can contain samples of one or more consumer interactions with advertising content, information associated with the consumer or transaction, or information associated with the advertisement. The user data can represent a variety of consumer behaviors in relation to advertising, such as, clicks, non-clicks, views, non-views, touches, non-touches, likes, dislikes, purchases, non-purchases, selections, non-selections, and so forth. The user data can also represent many types of user information, such as, gender, location, age, device-type, ethnicity, page-views, purchases, and so forth. The user data can also represent user interaction with any type of digital advertisement, and any component thereof, in any digital medium. In one or more embodiments, the trajectory generator 102 can generate trajectories of the policy, risk, and constraint parameters by sampling the user data 110.

In one or more embodiments, the ad recommendation policy information 1102 can include data representing one or more possible ad recommendation policies. For example, the ad recommendation policy information 112 can include recommended advertising content based on information known about a potential consumer. The ad recommendation policy information 112 can contain portions of an ad recommendation policy that can be combined together. The ad recommendation policy information 112 can gather information direction from client devices or receive information from an analytics server or another source. In one or more embodiments, the trajectory generator 102, the gradient estimator 104, and the policy selector 106 can access the ad recommendation policy information 112 to select an ad recommendation policy.

Moreover, the data storage manager 108 can also risk preference information 114. The risk preference information can include risk-tolerance values or confidence levels or other user preferences required or desired for alternative embodiments. The risk-tolerance values, confidence intervals, and other preferences can be defined by a user or client or can be automatically generated by the system based on default settings.

Figure 2:
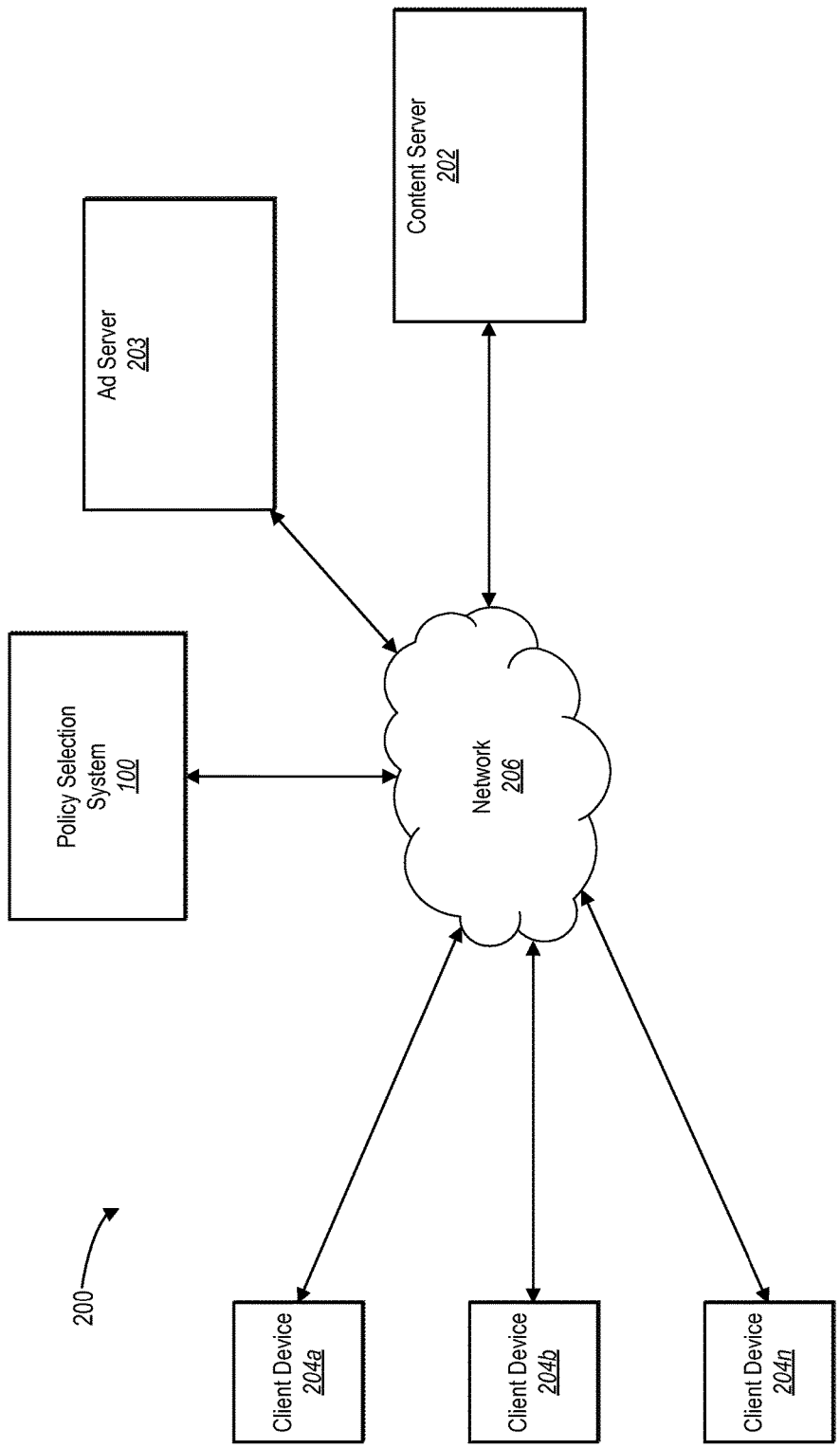
FIG. 2 illustrates a schematic diagram of an exemplary environment in which the policy selection system of FIG. 1 can operate in accordance with one or more embodiments.

FIG. 2 illustrates a schematic diagram of one embodiment of an exemplary environment 200 in which the policy selection system 100 can operate. In one or more embodiments, the exemplary environment 200 includes a content server 202, an ad server 203, a policy selection system 100, and a plurality of client devices 204a, 204b-204n via a network 206. Although the environment 200 of FIG. 2 is depicted as having various components, the environment 200 may have any number of additional or alternative components. For example, the information environment 200 can include other components not shown in FIG. 2

One or more embodiments of the client devices 204a-204n can access a webpage (or another marketing medium such as a native application) supported by the content server 202. In particular, the content server 202 can host or support the webpage. For example, the content server can include a web hosting application that allows the client devices 204a-204n to interact with content hosted at the content server 202. To illustrate, each of the client devices 204a-204n can run separate instances of a web application (e.g., a web browser) to allow users to access, view, and/or interact with a webpage or website hosted at the content server 202.

Upon a client device 204a accessing the webpage, the ad server 203 can provide an advertisement to be presented in connection with the webpage. The ad server 203 can select the advertisement based on an ad recommendation policy provided by the policy selection system 100 and user profile information obtained about the particular user or client device 204a accessing the webpage.

In one or more embodiments, an advertiser can use the policy selection system 100 to select an ad recommendation policy that optimizes clicks, conversions, or revenue, while also ensuring a minimum success rate subject to a predetermined confidence level. The policy selection system 100 can either provide an ad recommendation policy for the ad server 203 to follow. Otherwise, the policy selection system 100 can facilitate interaction between the ad server 203 and the content server 202. In particular, the policy selection system 100 can form part of a marketing agent that identifies ads for the ad server 203 to serve in connection with the webpage hosted by the content provider 202.

The policy selection system 100 can store, maintain, or have access to the profile information associated with one or more users or client devices 204a-204n. In particular, the policy selection system 100 can access information that can be used by the to select an ad recommendation policy or select advertisements. For example, the policy selection system 100 can obtain profile information for a user or other information that indicates preferences, characteristics, or interests associated with the user or client device 204a. In one implementation, the policy selection system 100 can access the profile information from an analytics server.

As previously described, the policy selection system 100 can be implemented on one or more devices. For example, the policy selection system 100 can include separate devices for performing one or more of the operations associated with the policy selection system 100. In one or more implementations, each of the devices can be in communication with the content server 202 or the ad server 203 via the network 206. In an alternative implementation, at least some of the devices in the policy selection system 100 may not be in communication with the content server 202 or the ad server 203 via the network 206, but may communicate with a specific device in the policy selection system 100 that is in communication with the ad server 203. In still further embodiments, the content server 202 or the ad server 203 can implement the policy selection system 100.

In alternative embodiments, the environment 200 can include a third party analytics system. In particular, the analytics system can be a third-party system that facilitates the collection of data, such as user data or ad recommendation policy information. In such instances, one or more content servers 202 can establish one or more accounts with the policy selection system 100 and the analytics system. The account(s) may allow the policy selection system 100 to obtain information from the analytics system. For example, a third party analytics system can monitor information regarding visitors to a website and provide potential consumer information to the policy selection system 100 for one or more accounts. The policy selection system can actively provide ad recommendation policies based on user data or other information. Similarly, a third party analytics system can actively collect and monitor user data for the policy selection system 100. The policy selection system 100 can provide updated ad recommendation policies as additional user data informs the selection process. In other embodiments, the policy selection system 100 can track user data or ad recommendation policy information directly.

In alternative embodiments, the content server 202 or the ad server 203 can employ the selected ad recommendation policy. In particular, the policy selection system 100 can provide an ad recommendation policy to the content server 202 or the ad server 203, which can then monitor user information and select advertising content for individual consumers in accordance with the ad recommendation policy. The policy selection system 100 can adjust the ad recommendation policy on demand for any number of reasons, such as a client request, updated user data, new advertising content, and so forth.

As discussed above, the policy selection system 100 can allow a marketer to select an ad recommendation policy that is both optimized with regard to expected results, while also ensuring that the expected results do not fall below a threshold within a given confidence level. Thus, the policy selection system 100 can prevent short term loses due to variance in an ad recommendation policy. One will appreciate in light of the disclosure provided herein that the policy selection system 100 can perform a tradeoff in potential lifetime value or return for low risk. In other words, an optimized ad recommendation policy selected by the policy selection system 100 can project a click-thru rate less than an ad recommendation policy optimized for life-time value without regard to risk.

Figure 3:
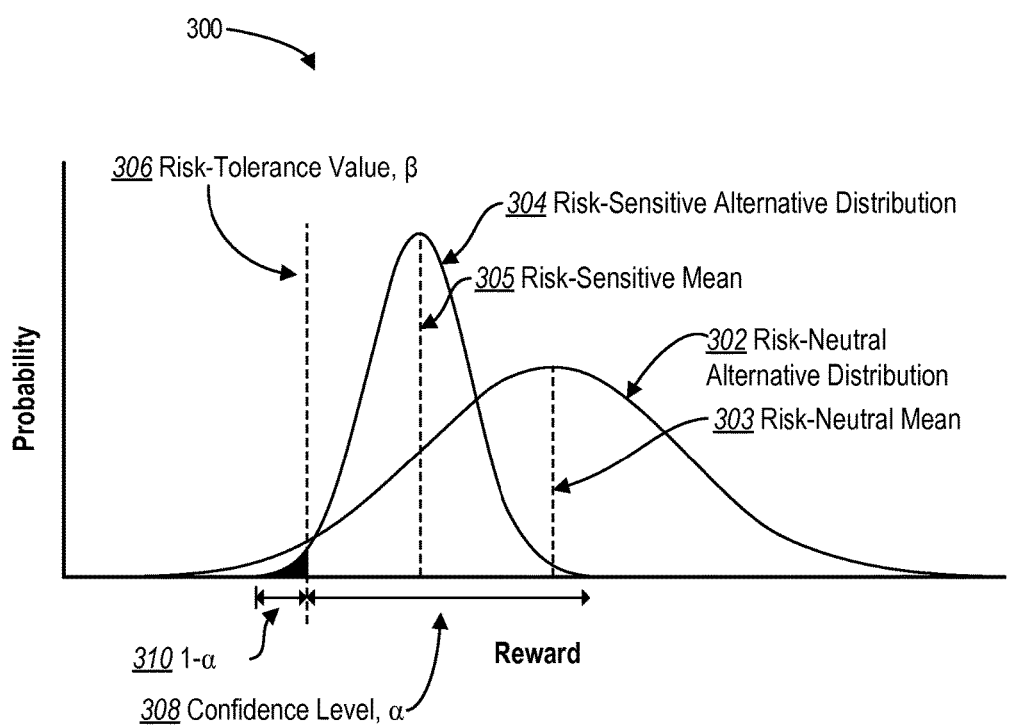
FIG. 3 illustrates a graph of a sample probability distribution for ad recommendation policies selected using a traditional risk-neutral alternative and risk-sensitive alternative in accordance with one or more embodiments.

For example, FIG. 3 illustrates a graph of a sample probability distribution 300 for ad recommendation policies selected using a traditional risk-neutral alternative 302 versus a risk-sensitive alternative 304 in accordance with one or more embodiments. The vertical axis reflects the probability of a particular reward, and the horizontal axis reflects the level of the reward. For example, in a digital marketing application, the probability distribution could reflect the probability of returning a certain number of clicks for a particular ad recommendation policy. The risk-neutral alternative distribution 302 represents a sample return distribution for a policy seeking to maximize mean return without considering risk. Graphically, the mean return value can be reflected as the middle of a Gaussian distribution curve, and maximizing the mean return value can be reflected by moving the middle of the curve in a desired direction.

As discussed, in implementing an ad recommendation policy, marketers often seek to maximize the mean return value. In risk-sensitive applications, however, a client may also need to control for the variation or risk associated with an ad recommendation policy. The amount of variation can be reflected graphically by the width of the distribution curve. The risk-sensitive alternative distribution 304 represents a sample return distribution for an ad recommendation policy in accordance with one or more embodiments of the present disclosure. The risk sensitive alternative 304 maximizes expected mean returns while also considering risk values associated with the particular client application.

FIG. 3 shows that the risk-neutral mean 303 may be higher (further to the right) than the risk-sensitive mean 305. One or more embodiments of the present disclosure slightly reduce expected return values (i.e., move the return distribution further to the left), in order to lower the expected variance, or risk (i.e., narrow the width of the distribution). This provides users in risk-sensitive applications with the ability to minimize the risk of adverse business results, while maximizing the expected return in light of the client's ability to absorb variance or risk. Thus, as shown by FIG. 3, one would expect the variance of the risk-neutral alternative, as reflected by the width of the probability distribution, to be larger than the risk of the risk-sensitive alternative.

One or more embodiment of the present disclosure control for risk by allowing a user to select a risk-tolerance level, $\beta$ 306, and a confidence level $\alpha$ 308, such that the user can determine, to a confidence level $\alpha$, that the expected results would not fall below the risk-tolerance level $\beta$. Graphically, the risk-tolerance level $\beta$ 306 can be represented by a vertical line of results below which the client is unwilling, or unable, to fall. A return below this level would be unacceptable, based on the applicable level of risk in a particular application. Graphically, the confidence level $\alpha$ 308, can be represented by the area of the distribution falling within the selected risk-tolerance level. One or more embodiments measure or detect the area of the distribution falling within the selected risk-tolerance value and seek to identify an optimal ad recommendation policy that maximizes the expected return while also maintaining the area falling within the selected risk-tolerance value.

As shown, the probability of returning a result outside the selected risk-tolerance level can be represented as $1-\alpha$ 310. The area falling outside the selected risk-tolerance level 310 can also be referred to as the tail of the distribution curve or an unsatisfactory tail of the distribution curve. One or more embodiments detect or measure the size of the tail and seek to minimize or maintain the size of the tail within risk-tolerance thresholds while maximizing the mean. As shown, the probability, $1-\alpha$ 310, that the expected results will fall below the designated risk-tolerance level, $\beta$, is much smaller utilizing a risk-sensitive approach.

A number of methods exist for measuring or detecting the size of the tail for a given distribution, for example, the number of standard deviations or a value-at-risk measure (VaR). One measure, conditional value-at-risk (CVaR), is a measure of the mean of the tail distribution. One or more embodiments measure or detect CVaR and utilize CVaR to control variance in selecting an ad recommendation policy.

Other embodiments could utilize other variance measures in selecting an ad recommendation policy.

In some applications, a client may seek to avoid only certain kinds of variation, or risk, in selecting an ad recommendation policy. For example, a marketing client seeking to maximize the rate of clicks for advertising content may lose business if the click rate drops below a certain level, but will generally not be concerned if the click rate is unexpectedly high. In such a scenario, the client only seeks to avoid variation in the lower range of results. Graphically, this range of expected results is reflected by a region of the return distribution that falls below the client's risk threshold. FIG. 3 shows this lower range 310 for a sample risk-sensitive alternative distribution. Although FIG. 3 shows this area for a lower range, in other applications, a client may seek to avoid variation generally. For example, if a client is offering an advertisement that includes a free promotional give away, the client may want to guarantee a minimum amount of participation to promote the client's products while avoiding excessive distribution of free product. In such a scenario, the client may seek to avoid variation in both the upper and lower ranges of results. Similarly, a client may also seek to avoid variation only along an upper range of results, or some other variation range. One or more embodiments detect or control variation of a lower-tail distribution, an upper-tail distribution, or both. Moreover, although FIG. 3 represents a normal probability distribution drawn as a known curve, one or more embodiments of the policy selection system operate without the benefit of a known model and where distributions are non-Gaussian and stochastic.

Figure 4:
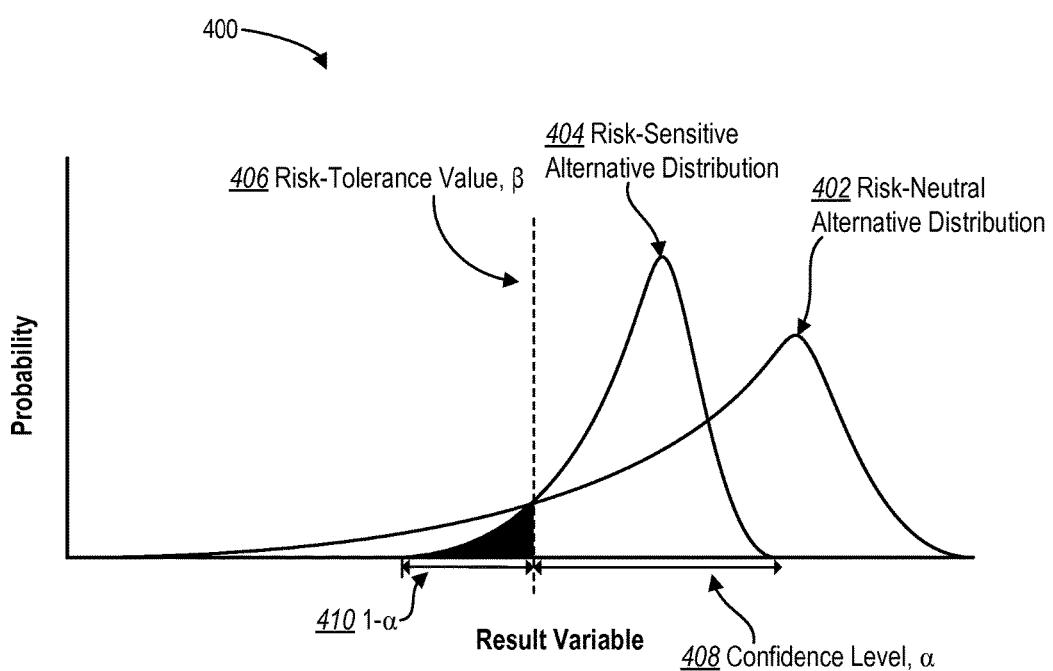
FIG. 4 illustrates a graph of a sample probability distribution with an uneven tail for ad recommendation policies selected using a traditional risk-neutral alternative and a risk-sensitive alternative in accordance with one or more embodiments.

FIG. 4 illustrates a sample non-Gaussian probability distribution 400 with an uneven tail for ad recommendation policies selected using a traditional risk-neutral alternative versus a risk-sensitive alternative in accordance with one or more embodiments. Unlike the normal distribution curve of FIG. 3 the non-normal curve of FIG. 4 is non-symmetrical, and more difficult to analyze. Similar to normal distributions, however, the width of the distribution provides a graphical representation of overall variance. Similarly, the horizontal location of the distribution indicates the expected return. In this case, the further to the right, the higher the reward. One or more embodiments of the present disclosure select a more optimal ad recommendation policy in light of risk even in the case of non-Gaussian distributions.

In such a non-Guassian distribution, the goal may be to minimize the size of the unsatisfactory tail. For example, a marketer may seek an ad recommendation policy that reduces the risk of results that fall below a certain threshold while maximizing the expected return. Although FIG. 4 shows the longer tail on the left side of the distribution, some probability distributions may have a longer tail on the right side, or have some other shape. Depending on the application, the unsatisfactory tail may occur on the left, on the right, or both.

FIG. 4 shows that the expected return for the traditional risk-neutral alternative 402 may be higher than the mean return for the risk-sensitive alternative 404, even in the scenario where the tail of the probability distribution is uneven. As in a normal distribution, one or more embodiments trade a slight reduction in average expected return for a reduction in variation, or risk; allowing a user to control for variance in risk-sensitive applications.

One or more embodiments allow a user to select a risk-tolerance level, $\beta$ 406, and a confidence level $\alpha$ 408, such that the user can determine, to a confidence level $\alpha$, that the expected results would not fall below the risk-tolerance level $\beta$, even as applied to a non-normal probability distribution. As discussed above, the risk-tolerance level $\beta$ 406 can be reflected graphically as a threshold line for risk that a user seeks to stay above. Similarly, a confidence level $\alpha$ 408 can be represented graphically by the area of the distribution falling within the selected risk-tolerance level. One or more embodiments measure or detect the area of the distribution falling within the selected risk-tolerance level and select an ad recommendation policy that maximizes the return while maintaining an acceptable risk tolerance and confidence interval.

The probability of a result falling outside the selected risk-tolerance level is shown as $1-\alpha$ 410 (often referred to as the tail, or unsatisfactory tail). One or more embodiments measure or detect the size of the unsatisfactory tail and utilize that measure to select a more optimal policy. As shown, the probability, $1-\alpha$ 410, that the expected results will fall below the designated risk-tolerance level, $\beta$, is much smaller utilizing a risk-sensitive approach.

Although normal distribution curves are symmetrical, meaning a reduction in variation on one side of the curve may result in a symmetrical reduction on the opposite side of the curve, non-normal distributions are not symmetrical. Accordingly, embodiments can detect unsatisfactory tails and seek to identify ad recommendation policies that reduce the size of the tail and increase the size of the desired reward. As discussed, one or more embodiments utilize the CVaR measure to detect and measure variance in identifying an optimal ad recommendation policy. CVaR is a measure of the mean of the $\alpha$-tail distribution. CVaR is representative of the tail, more stable, and easier to work with numerically in non-normal distributions.

One or more embodiments come to an optimal ad recommendation policy by identifying the CVaR of a random variable (or more than one random variable) and the expectation of the variable(s). The policy selection system 100 can seek to optimize by identifying an ad recommendation policy that maximizes the expectation subject to the CVaR being less than a certain risk tolerance at a certain confidence level. Graphically, the optimization problem equates to identifying the mean of the tail, identifying the expected return value of the distribution curve, accessing ad recommendation policies, analyzing the other ad recommendation policies based on their expected return and mean tail value, and then selecting a different ad recommendation policy with a higher expected return on the distribution curve and a mean tail value within the risk-tolerance level line at a certain confidence level.

Consider, for example, a user that visits a website. The policy selection system 100 can generate or receive a vector representing the characteristics of the user; such as, demographics, location, recency of visits, frequency, etc. The policy selection system 100 takes the vector as input and can map the vector to a distribution over the range of possible actions. The client or user can inform the policy selection system 100 regarding the type of distribution (for example, Gaussian or non-Gaussian) and the applicable parameters. The policy selection system 100 chooses the appropriate policy according to the probability of the expected return and variance.

One or more embodiments solve the optimization problem by estimating gradients that point toward the optimal ad recommendation policy. The gradient estimates incorporate parameters that constrain the optimization problem to the particular scenario at issue. For example, some embodiments utilize a gradient estimate directed to variance parameters. In particular, the gradient estimate directed to variance parameters can constrain the optimization so that the policy selection system 100 selects policies with distributions that satisfy the applicable risk tolerance threshold and confidence level. One or more embodiments receive or identify one or more variance parameters and update those parameters in the descent direction in selecting an ad recommendation policy.

Similarly, some embodiments estimate a gradient with regard to policy parameters. In particular, policy parameters could include all available ad recommendation policies, all possible ad recommendation policy combinations, possible percentile combinations of ad recommendation policies, or desired policy objectives, such as maximizing a particular reward. For example, the ad recommendation policy parameters can comprise ad recommendation policies A and B, while specifying that the policy selection system can generate a final ad recommendation policy consisting of any combination of A and B ranging from 48 to 52 percent of A and 48 to 52 percent of B such that the combination maximizes the number of clicks within the given risk parameters. One or more embodiments identify policy parameters and update those parameters in the descent direction to identify an optimal ad recommendation policy. The policy selection system 100 can identify policy parameters in a number of ways. For example, a user/marketer can provide a set of policies. The user/marketer operating the policy selection system 100 can decide on a set of policies. One or more embodiments assist in deciding on a range of policies or parameters to consider.

Moreover, some embodiments utilize a gradient estimate directed to Lagrangian parameters, or a Lagrangian multiplier. Specifically, the Lagrangian parameters can reflect the parameters of strategy to obtaining an optimal solution. Lagrangian parameters can reflect the trade off between optimizing the objective or the constraints. Moreover, Lagrangian parameters can comprise the conditions for optimality in the constrained problem. For example, to identify a maximum return value in a function subject to some independent condition, it is possible to identify certain conditions. The Lagrangian parameters can reflect these conditions and a strategy for locating the optimal solution. By estimating gradients subject to the Lagrangian parameters, one or more embodiments select an ad recommendation policy with conditions more likely to solve the optimization problem. One or more embodiments identify Lagrangian parameters and update those parameters in the descent direction in selecting an optimal ad recommendation policy.

One or more embodiments estimate separate gradients with regard to the three sets of parameters described above: risk parameters, policy parameters, and constraint (e.g., Lagrangian) parameters. Other embodiments can estimate gradients with regard to other parameters depending on the particular application. The policy selection system 100 can estimate gradients applicable to any number or type of risk-sensitive functions, including ad recommendation policies for a variety of applications, advertising content, or consumer groups, and also inclusive of other complex decision-making processes (such as the stopping problem described below).

Figure 5:
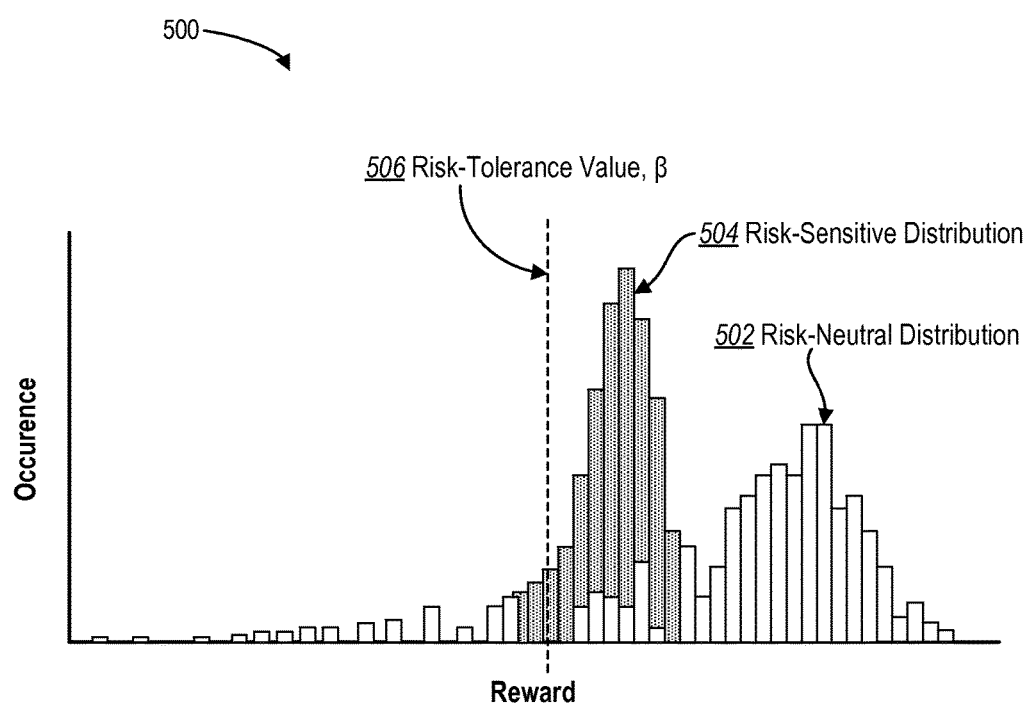
FIG. 5 illustrates a probability distribution reflecting a set of sample data results—rather than an approximate data curve or system model—for ad recommendation policies selected using a traditional risk-sensitive alternative versus a risk-sensitive alternative in accordance with one or more embodiments.

Estimating gradients with regard to one or more parameters allows the policy selection system 100 to operate without the benefit of knowing the precise dynamics of the system. Thus, although FIG. 4 represents a non-normal probability distribution drawn by a known curve, it will be appreciated that one or more embodiments of the policy selection system 100 operate without the benefit of a known model. FIG. 5 illustrates a probability distribution 500 reflecting a set of sample data results—rather than an approximate distribution curve—for ad recommendation policies selected using a traditional risk-sensitive alternative versus a risk-sensitive alternative in accordance with one or more embodiments. Thus, FIG. 5 is a visual representation of actual results from adopting an ad recommendation policy. The vertical axis represents the actual number of times a particular level of reward occurs while the horizontal axis represents the level of the reward. Graphically, the variance of the results in FIG. 5 is represented by the width of the results on the distribution chart. Similarly, the horizontal location of the results indicates the level of reward. Thus, the further to the right and the narrower the range of results on the distribution chart, the higher the reward and the smaller the variance.

Again, the risk-neutral distribution 502 tends to have a higher mean value, and higher range, than the risk-sensitive distribution 504 calculated to control for a risk-tolerance value, $\beta$ 506. This reflects a typical expected result in applying one or more embodiments to a risk-sensitive decision-making problem where the precise system model is unknown. In exchange for a reduction in expected return, a user can control the risk associated with selection of a recommendation policy even without an understanding of the exact interaction amongst all variables.

Even though the precise system dynamics may be unknown, one or more embodiments of the policy selection system 100 can identify an optimal ad recommendation policy by estimating the gradient with regard to various parameters using sampling methods, such as Monte Carlo sampling. Some embodiments select a current policy, generate samples from sample data, and create trajectories following the current policy in light of the sample data. The sample data can come from a number of sources and reflect data correlating a number of variables. For example, the policy selection system 100 can track individuals that visit a website and interact with advertising content, gather available information regarding the individual visitors, and correlate that information with how the user interacted with the advertising content or website. Alternatively, a client could provide the data or a third-party system could gather and provide the data.

The policy selection system 100 can generate samples from the data to calculate trajectories. Each of the trajectories reflect an anticipated result from following the current policy based on a sample data point. The policy selection system 100 can create trajectories from the data samples and then utilize those trajectories to assist in selecting an optimal ad recommendation policy. Specifically, the policy selection system 100 can utilize the trajectories to estimate gradients and update parameters associated with the gradient estimates, pointing toward an optimal ad recommendation policy. In light of the updated parameters, the policy selection system 100 can select a new policy based on the gradient estimates and updated parameters. One or more embodiments update parameters after observing several trajectories. The number of trajectories selected can vary depending on the embodiment, the application, and the available data.

In one or more embodiments, the policy selection system 100 can repeatedly select an ad recommendation policy, sample data, create trajectories, estimate gradients, and select a more optimal policy. Specifically, after identifying a new policy, the policy selection system 100 can create additional trajectories for the new policy by generating samples from the sample data. The disclosed systems and methods can then utilize the additional trajectories to estimate gradients. The gradient estimates can update the applicable parameters, pointing toward a more optimal ad recommendation policy. The policy selection system 100 can repeat this process until converging to an optimal ad recommendation policy. Thus, the present disclosure allows a user to identify an optimal ad recommendation policy without knowing a system model by using sample data to inform the policy selection system.

Because of the complexity of the optimization problem for selecting a policy, one or more embodiments converge the various set of parameters toward a solution simultaneously (i.e., converge one set of parameters toward a solution while also converging another set of parameters toward a solution), rather than iteratively (i.e., by solving for one set of parameters before seeking to solve for another set of parameters). Moreover, one or more embodiments update some parameters on a faster time scale than others. Embodiments that utilize varying time scales can converge to an optimal solution more easily in some applications.

Because one or more embodiments seek to maximize expected return subject to a risk threshold, converging on parameters that fail to meet a risk-tolerance would be counter-productive. Accordingly, the policy selection system 100 can seek to estimate the gradient related to risk parameters on the fastest time scale. If the risk parameter converges, the risk constraints are more likely to be satisfied. For example, in embodiments utilizing CVaR as a risk measure, convergence of risk parameters on a faster time scale can help ensure that CVaR falls within the applicable risk constraints.

In addition to satisfying constraints related to variance, the policy selection system 100 can seek to come to a decision or policy that maximizes expected return. Accordingly, one or more embodiments estimate the gradient related to the policy parameters on an intermediate time scale. As the policy selection system 100 converges on risk and policy parameters, the policy selection system 100 can converge constraint or Lagrangian parameters. Thus, the policy selection system 100 can estimate the gradient related to Lagrangian parameters on the slowest time scale. Embodiments utilizing this approach may converge on policies meeting the desired reward objectives subject to the constraints on variance.

As outlined in greater detail below, applying multiple time-scales assists the policy gradient algorithm in converging efficiently on an ad recommendation policy subject to the applicable risk and system constraints. Accordingly some embodiments choose a policy, generate trajectories based on samples, estimate gradients, change parameters simultaneously (although on different time scales), identify another policy, and repeat as necessary or desired. This process can be repeated until the user wishes to stop the process or until the policy has converged to an optimal policy. For example, repeating can cease if a client is satisfied with the selected ad recommendation policy or if the method has converged to an optimal ad recommendation policy. Alternatively, the process can repeat only a subset of steps, such as the step of estimating gradients, or the steps of estimating gradients and selecting a new policy based on those gradients. Other embodiments employ fewer than all of these steps, or perform these steps in a different order.

The number and type of gradient estimates, however, can vary depending on the particular embodiment. Moreover, some embodiments may allow the client or user to adjust the time-scale applicable to each parameter, depending on the particular application and data. Still further, in some embodiments the policy selection system 100 may or may not utilize a time-scale. For example, the policy selection system 100 may be more efficient to have the fastest time scale applicable to other parameters. Similarly, in some embodiments, the policy selection system 100 can set the difference in time-scales to be greater than in other use cases.

Furthermore, one or more embodiments employ projection operators to help ensure convergence of the gradient estimates in a policy gradient algorithm. The projection operators project vectors onto the gradient estimates. This can help to ensure that the policy gradient algorithm converges. The particular projection operators may differ depending on the embodiment and particular application. Some embodiments may not utilize projection operators to help converge to an optimal policy.

As described above, one or more embodiments calculate trajectories, estimate gradients, and identify an ad recommendation policy according to a policy gradient algorithm. One embodiment of such an algorithm is described below. The unit of observation in this algorithm is a system trajectory generated by following the current policy. At each iteration, the algorithm generates N trajectories by following the current policy, uses them to estimate the gradients, and then uses these estimates to update the parameters, resulting in parameters pointing toward a new ad recommendation policy.

For purposes of the present embodiment, consider an environment modeled as a Markov decision process (MDP) defined as a tuple $M=(\mathcal{X}, \mathcal{A}, C, P, P_0)$, where $\mathcal{X}=\{1, \ldots, n\}$ and $\mathcal{A}=\{1, \ldots, m\}$ are the state and action spaces; $C(x, a) \in [-C_{max}, C_{max}]$ is the bounded cost random variable whose expectation is donated by $c(x, a)=\mathbb{E}[C(x, a)]$; $P(\cdot|x, a)$ is the transition probability distribution; and $P_0(\cdot)$ is the initial state distribution. For simplicity, the present embodiment assumes that the system has a single initial state $x^0$, i.e., $P_0(x)=1\{x=x^0\}$. It will be recognized that the embodiment disclosed can be easily extended to the case that the system has more than one initial state.

A stationary policy $\mu(\cdot|x)$ is a probability distribution over actions, conditioned on the current state. In the policy gradient algorithm this embodiment defines a class of parameterized stochastic policies $\{\mu(\cdot|x; \theta), x \in \mathcal{X}, \theta \in \Theta \subseteq \mathbb{R}^{\kappa_1}\}$. Because $\mu$ is represented by its $\kappa_1$-dimensional parameter vector $\theta$, for purposes of the present embodiment, $\mu$ and $\theta$ are used interchangeably.

In the present embodiment, Z is a bounded-mean variable, i.e., $\mathbb{E}[|Z|]<\infty$, with the cumulative distribution function $F(z)=\mathbb{P}(Z \leq z)$. At a confidence level $\alpha \in (0,1)$ the present embodiment defines the value-at-risk (VaR) as $$VaR_\alpha(Z)=\min\{z|F(z) \geq \alpha\}.$$

The $\gamma$-discounted visiting distribution of state x and state-action pair (x, a) under policy $\mu$ is denoted:

$$d_\gamma^\mu(x|x^0)=(1-\gamma)\Sigma_{k=0}^\infty \gamma^k \mathbb{P}(x_k=x|x_0=x^0;\mu) \text{ and}$$

$$\pi_\gamma^\mu(x,a|x^0)=d_\gamma^\mu(x|x^0)\mu(a|x).$$

Here the minimum is attained because F is non-decreasing and right-continuous in Z. When F is continuous and strictly increasing, $VaR_\alpha(z)$ is the unique z satisfying $F(z)=\alpha$, otherwise, the VaR equation can have no solution or a whole range of solutions. VaR suffers from being unstable and difficult to work with numerically when Z is not normally distributed, which is often the case, as loss distributions tend to exhibit fat tails or empirical discreteness. Moreover, VaR is not a coherent risk measure and more importantly does not quantify the losses that might be suffered beyond its value at the $\alpha$-tail distribution of Z.

The CVaR is the mean of the α-tail distribution of Z. Where there is no probability atom at $VaR_\alpha(z)$, $CVaR_\alpha(Z)$ has a unique value defined as:

$$CVaR_\alpha(Z) = \mathbb{E}[Z|Z \geq VaR_\alpha(Z)].$$

As established by Rockafellar and Uryasev, see R. Rockafellar and S. Uryasev, *Optimization of Conditional Value-at-Risk*, JOURNAL OF RISK 26:1443-1471 (2002)—incorporated herein by reference in its entirety—it will be recognized that:

$$CVaR_\alpha(Z) = \min_{v \in \mathbb{R}} H_\alpha(Z, v) \triangleq \min_{v \in \mathbb{R}} \left\{ v + \frac{1}{1-\alpha} \mathbb{E}[(Z-v)^+] \right\} \quad (1)$$

where $(x)^+ = \max(x, 0)$ represents the positive part of x. As a function of v, $H_\alpha(\cdot, v)$ is finite, convex, and continuous.

The present embodiment further defines the loss of a state x, or the loss of a state-action par (x, a), as the sum of costs encountered by the agent when it starts at state x, or state action pair (x, a), and then follows policy μ. This can be articulated as follows:

$$D^\theta(x) = \Sigma_{k=0}^\infty \gamma^k C(x_k, a_k) | x_0 = x, \mu$$

$$D^\theta(x, a) = \Sigma_{k=0}^\infty \gamma^k C(x_k, a_k) | x_0 = x, a_0 = a, \mu.$$

Furthermore, the expected value of these two random variables are the value and action-value functions of policy μ, expressed as:

$$V^\theta(x) = \mathbb{E}[D^\theta(x)] \text{ and}$$

$$Q^\theta(x, a) = \mathbb{E}[D^\theta(x, a)].$$

CVaR Optimization Problem

The goal in the standard discounted formulation is to find an optimal policy $\theta^* = \arg\min_\theta V^\theta(x^0)$. For CVaR optimization as utilized in the present embodiment, and for a given confidence level $\alpha \in (0,1)$ and loss tolerance $\beta \in \mathbb{R}$, the optimization problem can be expressed as $$\min_\theta V^\theta(x^0) \text{ subject to } CVaR_\alpha(D^\theta(x^0)) \leq \beta. \quad (2)$$

Given the discussion of CVaR and $H_\alpha$ above (see Equation 1), the optimization problem (Equation 2) can be rewritten:

$$\min_{\theta, v} V^\theta(x^0) \text{ subject to } H_\alpha(D^\theta(x^0), v) \leq \beta \quad (3)$$

It will be recognized that by employing Lagrangian relaxation procedures, the optimization problem (Equation 3) can be converted to the following unconstrained problem:

$$\max_{\lambda \geq 0} \min_{\theta, v} \left( L(\theta, v, \lambda) \triangleq V^\theta(x^0) + \lambda(H_\alpha(D^\theta(x^0), v) - \beta) \right) \quad (4)$$

where λ is the Lagrange multiplier. The goal is to find the saddle point of $L(\theta, v, \lambda)$, i.e., a point $(\theta^*, v^*, \lambda^*)$ that satisfies:

$$L(\theta, v, \lambda^*) \geq L(\theta^*, v^*, \lambda^*) \geq L(\theta^*, v^*, \lambda), \forall \theta, v, \forall \lambda \geq 0.$$

This can be achieved by descending in θ and v and ascending in λ using the gradients of $L(\theta, v, \lambda)$ with regard to θ, v, and λ.

Calculating the Gradients

The gradients of $L(\theta, v, \lambda)$ with regard to θ, v, and λ are each calculated below. A trajectory generated by following the policy θ can be represented as $$\xi = \{x_0, a_0, x_1, a_1, \ldots, x_{T-1}, a_{T-1}, x_T\}$$

where $x_0 = x^0$ and $x_T$ is usually a terminal state of the system. After $x_k$ visits the terminal state, it enters a recurring sink state $x_S$ at the next time step, incurring zero cost, i.e. $C(x_S, a) = 0, \forall a \in \mathcal{A}$. Time index T is the stopping time of the MDP. Since the transition is stochastic, T is a non-deterministic quantity. It is assumed that the policy μ is proper. This further means that with probability 1, the MDP exits the transient states and hits $x_S$ (and stays in $x_S$) in finite time T. For simplicity, assume that the agent incurs zero cost at the terminal state, although analogous results for the general case with a non-zero terminal cost can be derived using identical arguments. The loss ξ can be defined as $$D(\xi) = \Sigma_{k=0}^{T-1} \gamma^k C(x_k, a_k)$$

and the probability of ξ can be defined as $$\mathbb{P}_\theta(\xi) = P_0(x_0) \Pi_{k=0}^{T-1} \mu(a_k | x_k; \theta) P(x_{k+1} | x_k, a_k).$$

It will be appreciated that $$\nabla_\theta \log \mathbb{P}_\theta(\xi) = \Sigma_{k=0}^{T-1} \nabla_\theta \log \mu(a | X; \theta).$$

Gradient of $L(\theta, v, \lambda)$ with Regard to θ:

By expanding the expectations in the definition of the objective function $L(\theta, v, \lambda)$ in Equation 4, the following results:

$$L(\theta, v, \lambda) = \sum_\xi \mathbb{P}_\theta(\xi) D(\xi) + \lambda v + \frac{\lambda}{(1-\alpha)} \sum_\xi \nabla_\theta \mathbb{P}_\theta(\xi)(D(\xi) - v)^+ - \lambda \beta.$$

By taking the gradient with respect to θ:

$$\nabla_\theta L(\theta, v, \lambda) = \Sigma_\xi \nabla_\theta \mathbb{P}_\theta(\xi) D(\xi) + \frac{\lambda}{(1-\alpha)} \Sigma_\xi \nabla_\theta \mathbb{P}_\theta(\xi)(D(\xi) - v)^+.$$

This gradient can be rewritten as $$\nabla_\theta L(\theta, v, \lambda) = \quad (5)$$

$$\Sigma_\xi \mathbb{P}_\theta(\xi) \cdot \nabla_\theta \log \mathbb{P}_\theta(\xi) \left( D(\xi) + \frac{\lambda}{(1-\alpha)}(D(\xi) - v) \mathbf{1}\{D(\xi) \geq v\} \right),$$

where $$\nabla_\theta \log \mathbb{P}_\theta(\xi) =$$

$$\nabla_\theta \left\{ \sum_{k=0}^{T-1} \log P(x_{k+1} | x_k, a_k) + \log \mu(a_k | x_k; \theta) + \log \mathbf{1}\{x_0 = x^0\} \right\} =$$

$$\sum_{k=0}^{T-1} \frac{1}{\mu(a_k | x_k; \theta)} \nabla_\theta \mu(a_k | x_k; \theta) = \sum_{k=0}^{T-1} \nabla_\theta \log \mu(a_k | x_k; \theta)$$

Sub Differential of $L(\theta, v, \lambda)$ with Regard to v.

From the definition of $L(\theta, v, \lambda)$, it will be appreciated that $L(\theta, v, \lambda)$ is a convex function in v for any fixed $\theta \in \Theta$. Note that for every fixed v and v'

$$(D(\xi) - v')^+ - (D(\xi) - v)^+ \geq g \cdot (v' - v)$$

Where g is any element in the set of sub-derivatives:

$$g \in \delta_v(D(\xi) - v)^+ \triangleq \begin{cases} -1 & \text{if } v < D(\xi), \\ -q : q \in [0, 1] & \text{if } v = D(\xi), \\ 0 & \text{otherwise.} \end{cases}$$

Since $L(\theta,v,\lambda)$ is finite-valued for any $v \in \mathbb{R}$, by the additive rule of sub-derivatives:

$$\delta_v L(\theta, v, \lambda) = \\ \left\{-\frac{\lambda}{(1-\alpha)}\Sigma_\xi \mathbb{P}_\theta(\xi)1\{D(\xi) > v\} - \frac{\lambda q}{(1-\alpha)}\Sigma_\xi \mathbb{P}_\theta(\xi)1\{D(\xi) = v\} + \lambda \bigg| \\ q \in [0,1]\right\} \quad (6)$$

In particular for $q=1$, the sub-gradient of $L(\theta,v,\lambda)$ with regard to $v$ can be written:

$$\delta_v L(\theta, v, \lambda)|_{q=0} = \lambda - \frac{\lambda}{(1-\alpha)}\Sigma_\xi \mathbb{P}_\theta(\xi) \cdot 1\{D(\xi) \geq v\}$$

or $$\lambda - \frac{\lambda}{(1-\alpha)}\sum_\xi \mathbb{P}_\theta(\xi) \cdot 1\{D(\xi) \geq v\} \in \delta_v L(\theta, v, \lambda).$$

Gradient of $L(\theta,v,\lambda)$ with Regard to $\lambda$:

Because $L(\theta,v,\lambda)$ is a linear function in $\lambda$, it will be appreciated that the gradient of $L(\theta,v,\lambda)$ with regard to $\lambda$ can be expressed as follows:

$$\nabla_\lambda L(\theta, v, \lambda) = v - \beta + \frac{1}{(1-\alpha)}\sum_\xi \mathbb{P}_\theta(\xi) \cdot (D(\xi) - v)1\{D(\xi) \geq v\}$$

Accordingly, one way to find the desired saddle point discussed above, is to descend in $\theta$ and $v$ and ascend in $\lambda$ using the gradients of $L(\theta,v,\lambda)$ with regard to $\theta$, $v$, and $\lambda$ as follows:

$$\nabla_\theta L(\theta, v, \lambda) = \nabla_\theta V^\theta(x^0) + \frac{\lambda}{(1-\alpha)}\nabla_\theta \mathbb{E}[(D^\theta(x^0) - v)^+], \quad (8)$$

$$\delta_v L(\theta, v, \lambda) = \\ \lambda\left(1 + \frac{1}{(1-\alpha)}\delta_v \mathbb{E}[(D^\theta(x^0) - v)^+]\right) \ni \lambda\left(1 - \frac{1}{(1-\alpha)}\mathbb{P}(D^\theta(x^0) \geq v)\right), \quad (9)$$

$$\nabla_\lambda L(\theta, v, \lambda) = v + \frac{1}{(1-\alpha)}\mathbb{E}[(D^\theta(x^0) - v)^+] - \beta \quad (10)$$

This assumes that there exists a policy $\mu(\bullet|\bullet; \theta)$ such that $CVaR_\alpha(D^\theta(x^0)) \leq \beta$ (feasibility assumption). It will be appreciated that there exists a deterministic history-dependent optimal policy for CVaR optimization. Moreover, note that this policy does not depend on the complete history, but only on the current time step k, current state of the system $x_k$, and accumulated discounted cost, $\Sigma_{i=0}^{k}\gamma^i C(x_i, a_i)$.

Optimization Algorithm

Algorithm 1 below contains the pseudo-code for one embodiment solving the CVaR optimization problem described above (see Equation 4). What appears inside the parentheses on the right-hand-side of the update equations are the estimates of the gradients of $L(\theta,v,\lambda)$ (estimates of Equations 8-10) with regard to $\theta$, $v$, and $\lambda$, i.e., the gradients related to the policy parameter ($\theta$), risk parameter (v), and Lagrangian parameter ($\lambda$). $\Gamma_\Theta$ is an operator that projects a vector to the closest point in a compact and convex set $\Theta \subset \mathbb{R}^{K_1}$; $\Gamma_v$ is a projection operator to $$\left[-\frac{C_{max}}{1-\gamma}, \frac{C_{max}}{1-\gamma}\right];$$

and $\Gamma_\lambda$ is a projection operator to $[0, \lambda_{max}]$. These projection operators help ensure convergence of the algorithm. The algorithm also contains step-size schedules, $\zeta$. The step-size schedules ensure that the risk parameter $v$ update is on the fastest time-scale $\{\zeta_3(i)\}$, the policy parameter $\theta$ update is on the intermediate time-scale $\{\zeta_2(i)\}$, and the Lagrangian parameter $\lambda$ update is on the slowest time scale $\{\zeta_1(i)\}$. For purposes of the algorithms, the following assumptions apply:

Assumption 1:

For any state-action pair (x, a), $\mu(a|x; \theta)$ is continuously differentiable in $\theta$ and $\nabla_\theta \mu(a|x; \theta)$ is a Lipschitz function in $\theta$ for every $a \in \mathcal{A}$ and $x \in \mathcal{X}$.

Assumption 2:

The Markov chain induced by any policy $\theta$ is irreducible and aperiodic.

Assumption 3:

The step size schedules satisfy:

$$\Sigma_i \zeta_1(i) = \Sigma_i \zeta_2(i) = \Sigma_i \zeta_3(i) = \infty \quad (11)$$

$$\Sigma_i \zeta_1(i)^2, \Sigma_i \zeta_2(i)^2, \Sigma_i \zeta_3(i)^2 < \infty \quad (12)$$

$$\zeta_1(i) = o(\zeta_2(i)), \zeta_2(i) = o(\zeta_3(i)) \quad (13)$$

This results in a three time-scale stochastic approximation algorithm, as shown in Algorithm 1.

---

Algorithm 1

---

Input: parameterized policy $\mu(\cdot \mid \cdot; \theta)$, confidence level $\alpha$, and loss tolerance $\beta$.
Initialization: policy parameter $\theta = \theta_0$, risk parameter $v = v_0$, and Lagrangian parameter $\lambda = \lambda_0$
for i = 0, 1, 2, . . . do
  for j = 1, 2, . . . do
    Generate N trajectories $\{\xi_{j,i}\}_{j=1}^N$ by starting at $x_0 = x^0$ and following the current policy $\theta_i$.
  end for v Update: $v_{i+1} = \Gamma_v\left[v_i - \zeta_3(i)\left(\lambda_i - \frac{\lambda_i}{(1-\alpha)N}\sum_{j=1}^N 1\{D(\xi_{j,i}) \geq v_i\}\right)\right]$ Algorithm 1

$\theta$ Update: $\theta_{i+1} = \Gamma_\theta \left[ \theta_i - \zeta_2(i) \left( \frac{1}{N} \sum_{j=1}^{N} \nabla_\theta \log \mathbb{P}_\theta(\xi_{j,i}) \big|_{\theta=\theta_i} D(\xi_{j,i}) + \right. \right.$ $\left. \left. \frac{\lambda_i}{(1-\alpha)N} \sum_{j=1}^{N} \nabla_\theta \log \mathbb{P}_\theta(\xi_{j,i}) \big|_{\theta=\theta_i} (D(\xi_{j,i}) - v_i) 1\{D(\xi_{j,i}) \geq v_i\} \right) \right]$ $\lambda$ Update: $\lambda_{i+1} = \Gamma_\lambda \left[ \lambda_i + \zeta_1(i) \left( v_i - \beta + \frac{1}{(1-\alpha)N} \sum_{j=1}^{N} (D(\xi_{j,i}) - v_i) 1\{D(\xi_{j,i}) \geq v_i\} \right) \right]$ end for
return parameters $v$, $\theta$, and $\lambda$.

As shown by the foregoing pseudo code, the policy gradient algorithm (i.e., Algorithm 1) estimates the gradient of a performance measure with respect to the policy parameter $\theta$ from observed system trajectories. Then the policy gradient algorithm improves the policy by adjusting the parameters $\theta$, $v$, and $\lambda$ in the direction of the gradients.

Convergence of the Policy Gradient Algorithm

One or more embodiments that utilize Algorithm 1 will converge to a local saddle point of the risk-sensitive objective function $L(\theta, v, \lambda)$. The following proof establishes convergence of the policy gradient algorithm described above.

Theorem 1:

Suppose $\lambda^* \in [0, \lambda_{max}]$. Then the sequence of $(\theta, \lambda)$-updates in Algorithm 1 converges to a (local) saddle point $(\theta^*, v^*, \lambda^*)$ of the objective function $L(\theta, v, \lambda)$ almost surely, i.e., it satisfies $L(\theta, v, \lambda^*) \geq L(\theta^*, v^*, \lambda^*) \geq L(\theta^*, v^*, \lambda)$, $$\forall (\theta, v) \in \Theta \times \left[ -\frac{C_{max}}{1-\gamma}, \frac{C_{max}}{1-\gamma} \right] \cap \left| \beta_{(\theta^*, v^*)}(r) \right.$$

for some $r > 0$ and $\forall \lambda \in [0, \lambda_{max}]$. Note that $B_{(\theta^*, v^*)}(r)$ represents a hyper-dimensional ball centered at $(\theta^*, v^*)$ with radius $r$.

Since $v$ converges on the faster timescale than $\theta$ and $\lambda$, the $v$-update can be rewritten by assuming $(\theta, \lambda)$ as invariant quantities, i.e., $$v_{i+1} = \Gamma_v \left[ v_i - \zeta_3(i) \left( \lambda - \frac{\lambda}{(1-\alpha)N} \sum_{j=1}^{N} 1\{D(\xi_{(j,i)}) \geq v_i\} \right) \right]. \quad (14)$$

Consider the continuous time dynamics of $v$ defined using differential inclusion $$\dot{v} \in \Upsilon_v[-g(v)], \quad (15)$$

$\forall g(v) \in \partial_v L(\theta, v, \lambda),$ where $$\Upsilon_v[K(v)] := \lim_{0 < \eta \to 0} \frac{\Gamma_v(v + \eta K(v)) - \Gamma_v(v)}{\eta}$$

and $\Gamma_v$ is the Euclidean projection operator of $v$ to $$\left[ -\frac{C_{max}}{1-\gamma}, \frac{C_{max}}{1-\gamma} \right],$$

i.e., $$\Gamma_v(v) = \operatorname{argmin}_{\hat{v} \in \left[ -\frac{C_{max}}{1-\gamma}, \frac{C_{max}}{1-\gamma} \right]} \frac{1}{2} \|v - \hat{v}\|_2^2.$$

In general $\Gamma_v(v)$ is not necessarily differentiable. $\Upsilon_v[K(v)]$ is the left directional derivative of the function $\Gamma_v(v)$ in the direction of $K(v)$. By using the left direction derivative $\Upsilon_v[-g(v)]$ in the sub-gradient descent algorithm for $v$, the gradient will point at the descent direction along the boundary of $v$ whenever the $v$-update hits its boundary.

Furthermore, since $v$ converges on the faster timescale than $\theta$, and $\lambda$ is on the slowest time-scale, the $\theta$-update can be rewritten using the converged $v^*(\theta)$ and assuming $\lambda$ as an invariant quantity, i.e., $$\theta_{i+1} =$$

$$\Gamma_\theta \left[ \theta_i - \zeta_2(i) \left( \frac{1}{N} \sum_{j=i}^{N} \nabla_\theta \log \mathbb{P}_\theta(\xi_{j,i}) \bigg|_{\theta=\theta_i} D(\xi_{j,i}) + \frac{\lambda}{(1-\alpha)N} \sum_{j=i}^{N} \nabla_\theta \log \mathbb{P}_\theta \right. \right.$$

$$\left. \left. (\xi_{j,i}) \big|_{\theta=\theta_i} (D(\xi_{j,i}) - v) 1\{D(\xi_{j,i}) \geq v^*(\theta_i)\} \right) \right].$$

Consider the continuous time dynamics of $\theta \in \Theta$:

$$\dot{\theta} = \Upsilon_\theta[-\nabla_\theta L(\theta, v, \lambda)]|_{v=v^*(\theta)}, \quad (16)$$

where $$\Upsilon_\theta[K(\theta)] := \lim_{0 < \eta \to 0} \frac{\Gamma_\theta(\theta + \eta K(\theta)) - \Gamma_\theta(\theta)}{\eta}.$$

and $\Gamma_\theta$ is the Euclidean projection operator of $\theta$ to $\Theta$, i.e., $\Gamma_\theta(\theta) = \operatorname{argmin}_{\hat\theta \in \Theta} \frac{1}{2} \|\theta - \hat\theta\|_2^2$. Similar to the analysis of $v$, $\Upsilon_\theta[K(\theta)]$ is the left directional derivative of the function $\Gamma_\theta(\theta)$ in the direction of $K(\theta)$. By using the left directional derivative $\Upsilon_\theta[-\nabla_\theta L(\theta, v, \lambda)]$ in the gradient decent algorithm for $\theta$, the gradient will point at the descent direction along the boundary of $\Theta$ whenever the $\theta$-update hits its boundary.

Finally, since $\lambda$-update converges in a slowest time-scale, the $\lambda$-update can be rewritten using the converged $\theta^*(\lambda)$ and $v^*(\lambda)$, i. e., $$\lambda_{i+1} = \Gamma_\lambda\left(\lambda_i + \zeta_1(i)\left(v^*(\lambda_i) + \frac{1}{1-\alpha}\frac{1}{N}\sum_{j=1}^{N}(D(\xi_{j,i}) - v^*(\lambda_i))^+ - \beta\right)\right). \quad (17)$$

Consider the continuous time system $$\dot{\lambda}(t) = \Upsilon_\lambda[\nabla_\lambda L(\theta, v, \lambda)|_{\theta=\theta^*(\lambda), v=v^*(\lambda)}], \quad (18)$$

$$\lambda(t) \geq 0$$

where $$\Upsilon_\lambda[K(\lambda)] := \lim_{0<\eta\to 0}\frac{\Gamma_\lambda(\lambda + \eta K(\lambda)) - \Gamma_\lambda(\lambda)}{\eta},$$

and $\Gamma_\lambda$ is the Euclidean projection operator of $\lambda$ to $[0,\lambda_{max}]$, i.e., $\Gamma_\lambda(\lambda)=\text{argmin}_{\hat\lambda\in[0,\lambda_{max}]} \frac{1}{2}\|\lambda-\hat\lambda\|_2^2$. Similar to the analysis of $(v,\theta)$, $\Upsilon_\lambda[K(\lambda)]$ is the left directional derivative of the function $\Gamma_\lambda(\Delta)$ in the direction of $K(\lambda)$. By using the left direction derivative $\Upsilon_\lambda[\nabla_\lambda L(\theta,v,\lambda)]$ in the gradient ascent algorithm for $\lambda$, the gradient will point at the ascent direction along the boundary of $[0,\lambda_{max}]$ whenever the $\lambda$-update hits its boundary.

Define $$L^*(\lambda) = L(\theta^*(\lambda), v^*(\lambda), \lambda),$$

for $$\lambda \geq 0$$

where $$(\theta^*(\lambda), v^*(\lambda)) \in \Theta \times \left[-\frac{C_{max}}{1-\gamma}, \frac{C_{max}}{1-\gamma}\right]$$

is a local minimum of $$L(\theta, v, \lambda)$$

for fixed $$\lambda \geq 0,$$

i.e., $$L(\theta, v, \lambda) \geq L(\theta^*(\lambda), v^*(\lambda), \lambda)$$

for any $$(\theta, v) \in \Theta \times \left[-\frac{C_{max}}{1-\gamma}, \frac{C_{max}}{1-\gamma}\right] \cap B_{(\theta^*(\lambda), v^*(\lambda))}(r)$$

for some $$r > 0.$$

Next, it is desirable to show that the ordinary differential equation 18 is actually a gradient ascent of the Lagrangian function using the envelope theorem in mathematical economics. The envelope theorem describes sufficient conditions for the derivative of $L^*$ with respect to $\lambda$ where it equals to the partial derivative of the objective function $L$ with respect to $\lambda$, holding $(\theta,v)$ at its local optimum $(\theta,v)=(\theta^*(\lambda),v^*(\lambda))$. It can be shown that $\nabla_\lambda L^*(\lambda)$ coincides with $\nabla_\lambda L(\theta,v,\lambda)|_{\theta=\theta^*(\lambda),v=v^*(\lambda)}$ as follows.

Theorem 2:
The value function $L^*$ is absolutely continuous. Furthermore, $$L^*(\lambda)=L^*(0)+\int_0^\lambda \nabla_\lambda L(\theta,v,\lambda')|_{\theta=\theta^*(s),v=v^*(s),\lambda'=s}ds, \lambda\geq 0. \quad (19)$$

Proof.
The proof follows from analogous arguments of Lemma 4.3 in V. Borkar, *An Actor-Critic Algorithm for Constrained Markov Decision Processes*, IEEE TRANSACTION ON AUTOMATIC CONTROL (2014)—incorporated herein by reference in its entirety. From the definition of $L^*$, observe that for any $\lambda'$, $\lambda''\geq 0$ with $\lambda'<\lambda''$, $$|L^*(\lambda'') - L^*(\lambda')| \leq \sup_{\theta\in\Theta, v\in\left[-\frac{C_{max}}{1-\gamma},\frac{C_{max}}{1-\gamma}\right]}|L(\theta, v, \lambda'') - L(\theta, v, \lambda')| =$$

$$\sup_{\theta\in\Theta, v\in\left[-\frac{C_{max}}{1-\gamma},\frac{C_{max}}{1-\gamma}\right]}\left|\int_{\lambda'}^{\lambda''} \nabla_\lambda L(\theta, v, s) ds\right| \leq$$

$$\int_{\lambda'}^{\lambda''} \sup_{\theta\in\Theta, v\in\left[-\frac{C_{max}}{1-\gamma},\frac{C_{max}}{1-\gamma}\right]}|\nabla_\lambda L(\theta, v, s)| ds \leq \frac{3C_{max}}{(1-\alpha)(1-\gamma)}(\lambda''-\lambda').$$

This implies that $L^*$ is absolutely continuous. Therefore, $L^*$ is continuous everywhere and differentiable almost everywhere.

By the Milgrom-Segal envelope theorem of mathematical economics, see P. Milgrom and I. Segal, *Envelope Theorems for Arbitrary Choice Sets*, ECONOMETRICA, 70(2):583-601—incorporated herein by reference in its entirety—one can conclude that the derivative of $L^*(\lambda)$ coincides with the derivative of $L(\theta,v,\lambda)$ at the point of differentiability $\lambda$ and $\theta=\theta^*(\lambda)$, $v=v^*(\lambda)$. Also since $L^*$ is absolutely continuous, the limit of $(L^*(\lambda)-L^*(\lambda'))/(\lambda-\lambda')$ at $\lambda\uparrow\lambda'$ (or $\lambda\downarrow\lambda'$) coincides with the lower/upper directional derivatives if $\lambda'$ is a point of non-differentiability. Thus, there is only a countable number of non-differentiable points in $L^*$ and each point of non-differentiability has the same directional derivatives as the point slightly beneath (in the case of $\lambda\downarrow\lambda'$) or above (in the case of $\lambda\uparrow\lambda'$) it. As the set of non-differentiable points $L^*$ has measure zero, it can then be interpreted that $\nabla_\lambda L^*(\lambda)$ coincides with $\nabla_\lambda L(\theta,v,\lambda)|_{\theta=\theta^*(\lambda),v=v^*(\lambda)}$, i.e. Equation 19 holds.

Remark 1:
It can be shown that $L^*(\lambda)$ is a concave function. Since for given $\theta$ and $v$, $L(\theta,v,\lambda)$ is a linear function $\lambda$. Therefore, for any $\alpha'\in[0, 1]$, $\alpha'L^*(\lambda_1)+(1-\alpha')L^*(\lambda_2)\leq L^*(\alpha'\lambda_1+(1-\alpha')\lambda_2)$, i.e., $L^*(\lambda)$ is concave function. Concavity of $L^*$ implies that it is continuous and directionally (both left hand and right hand) differentiable in int dom($L^*$). Furthermore at any $\lambda=\hat\lambda$ such that the derivative of $L(\theta,v,\lambda)$ with respect of $\lambda$ at $\theta=\theta^*(\lambda)$, $v=v^*(\lambda)$ exists, $$\nabla_\lambda L^*(\lambda)|_{\lambda=\hat\lambda_+} = \frac{L^*(\hat\lambda_+) - L^*(\hat\lambda)}{\hat\lambda_+ - \hat\lambda} \geq \nabla_\lambda L(\theta, v, \lambda)\bigg|_{\theta=\theta^*(\lambda),v=v^*(\lambda),\lambda=\hat\lambda} \geq$$

$$(L^*(\hat\lambda_-) - L^*(\hat\lambda))/(\hat\lambda_- - \hat\lambda) = \nabla_\lambda L^*(\lambda)|_{\lambda=\hat\lambda_-}.$$

Furthermore concavity of $L^*$ implies $\nabla_\lambda L^*(\lambda)|_{\lambda=\hat\lambda_+}\leq \nabla_\lambda L^*(\lambda)|_{\lambda=\hat\lambda_-}$. Combining these arguments, one obtains $\nabla_\lambda L^*(\lambda)|_{\lambda=\hat\lambda_+}=\nabla_\lambda L(\theta,v,\lambda)\|_{\leftarrow=\theta^*(\lambda),v=v^*(\lambda),\lambda=\hat\lambda}=\nabla_\lambda L^*(\lambda)|_{\lambda=\hat\lambda_-}$.

In order to prove the main convergence result, the following standard assumptions and remarks are needed.

Assumption 4:

For any given $x^0 \in \mathcal{X}$ and $\theta \in \Theta$, the set $\{(v,g(v))|g(v) \in \partial_v L(\theta,v,\lambda)\}$ is closed.

Remark 2:

For any given $\theta \in \Theta$, $\lambda \geq 0$, and $g(v) \in \partial_v L(\theta,v,\lambda)$, we have $$|g(v)| \leq 3\lambda(1+|v|)/(1-\alpha). \tag{20}$$

To see this, recall that g can be parameterized by q as, for $q \in [0,1]$, $$g(v) = -\frac{\lambda}{(1-\alpha)} \sum_\xi \mathbb{P}_\theta(\xi) 1\{D(\xi) > v\} - \frac{\lambda_q}{1-\alpha} \sum_\xi \mathbb{P}_\theta(\xi) 1\{D(\xi) = v\} + \lambda$$

It is obvious that $|1\{D(\xi)=v\}|$, $|1\{D(\xi)>v\}| \leq 1+|v|$. Thus, $|\Sigma_\xi \mathbb{P}_\theta(\xi) 1\{D(\xi)>v\}| \leq \sup_\xi |1\{D(\xi)>v\}| \leq 1+|v|$, and $|\Sigma_\xi \mathbb{P}_\theta(\xi) 1\{D(\xi)=v\}| \leq 1+|v|$. Recalling $0<(1-q)$, $(1-\alpha)<1$, these arguments imply the claim of Equation 20.

Before getting into the main result, the following technical proposition is also needed.

Proposition 1: $\nabla_\theta L(\theta,v,\lambda)$ is Lipschitz in $\theta$.

Proof.

Recall that $$\nabla_\theta L(\theta, v, \lambda) = \sum_\xi \mathbb{P}_\theta(\xi) \cdot \nabla_\theta \log \mathbb{P}_\theta(\xi) \Big( D(\xi) + \frac{\lambda}{1-\alpha}(D(\xi)-v) 1\{D(\xi) \geq v\} \Big)$$

and $\nabla_\theta \log \mathbb{P}_\theta(\xi) = \Sigma_{k=0}^{T-1} \nabla_\theta \mu(a_k|x_k; \theta)/\mu(a_k|x_k; \theta)$ whenever $\mu(a_k|x_k; \theta) \in (0,1]$. Now Assumption 1 implies that $\nabla_\theta \mu(a_k|x_k; \theta)$ is a Lipschitz function in $\theta$ for any $a \in \mathcal{A}$ and $k \in \{0, \ldots, T-1\}$ and $\mu(a_k|x_k; \theta)$ is differentiable in $\theta$. Therefore, by recalling that $\mathbb{P}_\theta = \Pi_{k+1}^{T-1} P(x_{k+1}|x_k,a_k) \mu(a_k|x_k; \theta) 1\{x_0 = x^0\}$ and by combining these arguments and noting that the sum of products of Lipschitz functions is Lipschitz, one concludes that $\nabla_\theta L(\theta,v,\lambda)$ is Lipschitz in $\theta$.

Remark 3:

$\nabla_\theta L(\theta,v,\lambda)$ is Lipschitz in $\theta$ implies that $\|\nabla_\theta L(\theta,v,\lambda)\|^2 \leq 2(\|\nabla_\theta L(\theta_0,v,\lambda)\|+\|\theta_0\|)^2 + 2\|\theta\|^2$ which further implies that $$\|\nabla_\theta L(\theta,v,\lambda)\|^2 \leq K_1(1+\|\theta\|^2)$$

for $K_1 = 2 \max(1,(\|\nabla_\theta L(\theta_0,v,\lambda)\|+\|\theta_0\|)^2) > 0$. Similarly, $\nabla_\theta \log \mathbb{P}_\theta(\xi)$ is Lipschitz implies that $$\|\nabla_\theta \log \mathbb{P}_\theta(\xi)\|^2 \leq K_2(\xi)(1+\|\theta\|^2).$$

for a positive random variable $K_2(\xi)$. Furthermore, since $T < \infty$ w. p. 1, $\mu(a_k|x_k; \theta) \in (0,1]$ and $\nabla_\theta \mu(a_k|x_k; \theta)$ is Lipschitz for any $k<T$, $K_2(\xi) < \infty$ w. p. 1.

It is now possible to prove the convergence analysis of Theorem 1.

Proof.

[Proof of Theorem 1] The following four steps establish the proof:

Step 1 (Convergence of v-Update):

Since v converges in a faster time scale than $\theta$ and $\lambda$, one can assume both $\theta$ and $\lambda$ as fixed quantities in the v-update, i.e., $$v_{i+1} = \Gamma_v \Bigg( v_i + \zeta_3(i) \Bigg( \frac{\lambda}{(1-\alpha)N} \sum_{j=1}^N 1\{D(\xi_{j,i}) \geq v_i\} - \lambda + \delta v_{i+1} \Bigg) \Bigg) \tag{21}$$

and $$\delta v_{i+1} = \frac{\lambda}{1-\alpha} \Bigg( -\frac{1}{N} \sum_{j=1}^N 1\{D(\xi_{j,i}) \geq v_i\} + \sum_\xi \mathbb{P}_\theta(\xi) 1\{D(\xi) \geq v_i\} \Bigg) \tag{22}$$

First, one can show that $\delta v_{i+1}$ is square integrable, i.e.

$$\mathbb{E}[\|\delta v_{i+1}\|^2 | \mathcal{F}_{v,i}] \leq 4 \Big( \frac{\lambda_{max}}{1-\alpha} \Big)^2$$

where $\mathcal{F}_{v,i} = \sigma(v_m, \delta v_m, m \leq i)$ is the filtration of $v_i$ generated by different independent trajectories. Second, since the history trajectories are generated based on the sampling probability mass function $\mathbb{P}_\theta(\xi)$, Equation 6 implies that $\mathbb{E}[\delta v_{i+1} | \mathcal{F}_{v,i}] = 0$. Therefore, the v-update is stochastic approximation of the ordinary differential equation 15 with Martingale difference error term, i.e., $$\frac{\lambda}{1-\alpha} \sum_\xi \mathbb{P}_\theta(\xi) 1\{D(\xi) \geq v_i\} - \lambda \in -\partial_v L(\theta, v, \lambda) \Big|_{v=v_i^*}$$

Then one can invoke Corollary 4 in Chapter 5 of V. Borkar, *Stochastic Approximation: A Dynamical Systems Viewpoint*, Cambridge University Press (2008) (discussing stochastic approximation theory for non-differentiable systems)—incorporated herein by reference in its entirety—to show that the sequence $\{\|_i\}$, $$v_i \in \Big[ -\frac{C_{max}}{1-\gamma}, \frac{C_{max}}{1-\gamma} \Big]$$

converges almost surely to a fixed point $$v^* \in \Big[ -\frac{C_{max}}{1-\gamma}, \frac{C_{max}}{1-\gamma} \Big]$$

of differential inclusion (Equation 16), where $$v^* \in N_c := \Big\{ v \in \Big[ -\frac{C_{max}}{1-\gamma}, \frac{C_{max}}{1-\gamma} \Big] : \Upsilon_v[-g(v)] = 0, g(v) \in \partial_v L(\theta, v, \lambda) \Big\}.$$

To justify the assumptions of this theorem, 1) from Remark 2, the Lipschitz property is satisfied, i.e., $\sup_{g(v) \in f_v L(\theta,v,\lambda)} |g(v)| \leq 3\lambda(1+|v|)/(1-\alpha)$; 2) $\partial_v L(\theta,v,\lambda)$ is a convex compact set by definition; 3) Assumption 4 implies that $\{(v,g(v))|g(v) \in \partial_v L(\theta,v,\lambda)\}$ is a closed set, which implies that $\partial_v L(\theta,v,\lambda)$ is an upper semi continuous set valued mapping; 4) the step-size rule follows from Assumptions 1 to 3 (and corresponding discussion); 5) the Martingale difference assumption follows from Equation 22, and 6)

$$v_i \in \Big[ -\frac{C_{max}}{1-\gamma}, \frac{C_{max}}{1-\gamma} \Big],$$

$\forall i$ implies mat $\sup_i \|v_i\| < \infty$ almost surely.

Consider the ordinary differential equation of $v \in \mathbb{R}$ in Equation 15, and define the set-valued derivative of L as follows:

$$D_t L(\theta, v, \lambda) = \{g(v) Y_v[-g(v)] | \forall g(v) \in \partial_v L(\theta, v, \lambda)\}.$$

One may conclude that $$\max_{g(v)} D_t L(\theta, v, \lambda) = \max\{g(v) Y_v[-g(v)] | g(v) \in \partial_v L(\theta, v, \lambda)\}.$$

Consider the following cases:
Case 1:
  When $$v \in \left(-\frac{C_{max}}{1-\gamma}, \frac{C_{max}}{1-\gamma}\right).$$

For every $g(v) \in \partial_v L(\theta, v, \lambda)$, there exists a sufficiently small $\eta_0 > 0$ such that $$v - \eta_0 g(v) \in \left[-\frac{C_{max}}{1-\gamma}, \frac{C_{max}}{1-\gamma}\right]$$

and $$\Gamma_v(\theta - \eta_0 g(v)) - \theta = -\eta_0 g(v).$$

Therefore, the definition of $Y_\theta[-g(v)]$ implies $$\max_{g(v)} D_t L(\theta, v, \lambda) = \max\{-g^2(v) | g(v) \in \partial_v L(\theta, v, \lambda)\} \leq 0.$$

The maximum is attained because $\theta_v L(\theta, v, \lambda)$ is a convex compact set and $g(v) Y_v[-g(v)]$ is continuous function. At the same time, we have $\max_{g(v)} D_t L(\theta, v, \lambda) < 0$ whenever $0 \notin \partial_v L(\theta, v, \lambda)$.

Case 2:
  When $$v \in \left\{-\frac{C_{max}}{1-\gamma}, \frac{C_{max}}{1-\gamma}\right\}$$

and for any $g(v) \in \partial L_v(\theta, v, \lambda)$ such that $$v - \eta_0 g(v) \in \left[-\frac{C_{max}}{1-\gamma}, \frac{C_{max}}{1-\gamma}\right],$$

for any $\eta \in (0, \eta_0]$ and some $\eta_0 > 0$.
The condition $$v - \eta g(v) \in \left[-\frac{C_{max}}{1-\gamma}, \frac{C_{max}}{1-\gamma}\right]$$

implies that $Y_v[-g(v)] = -g(v)$.

Then the following obtains:

$$\max_{g(v)} D_t L(\theta, v, \lambda) = \max\{-g^2(v) | g(v) \in \partial_v L(\theta, v, \lambda)\} \leq 0.$$

Furthermore, $$\max_{g(v)} D_t L(\theta, v, \lambda) < 0$$

whenever $0 \notin \partial_v L(\theta, v, \lambda)$.
Case 3:
  When $$v \in \left\{-\frac{C_{max}}{1-\gamma}, \frac{C_{max}}{1-\gamma}\right\}$$

and there exists a non-empty set $$\mathcal{G}(v) := \left\{g(v) \in \partial L_v(\theta, v, \lambda) \,\middle|\, \theta - \eta g(v) \notin \left[-\frac{C_{max}}{1-\gamma}, \frac{C_{max}}{1-\gamma}\right], \exists \eta \in (0, \eta_0], \forall \eta_0 > 0\right\}.$$

First, consider any $g(v) | \mathcal{G}(v)$. For any $\eta > 0$, define $v_\eta := v - \eta g(v)$. The above condition implies that when $0 < \eta \to 0$, $\Gamma_v[v_\eta]$ is the projection of $v_\eta$ to the tangent space of $$\left[-\frac{C_{max}}{1-\gamma}, \frac{C_{max}}{1-\gamma}\right].$$

For any elements $$\hat{v} \in \left[-\frac{C_{max}}{1-\gamma}, \frac{C_{max}}{1-\gamma}\right],$$

since the following set $$\left\{v \in \left[-\frac{C_{max}}{1-\gamma}, \frac{C_{max}}{1-\gamma}\right]: \|v - v_\eta\|_2 \leq \|\hat{v} - v_\eta\|_2\right\}$$

is compact, the projection of $v_\eta$ on $$\left[-\frac{C_{max}}{1-\gamma}, \frac{C_{max}}{1-\gamma}\right]$$

exists. Furthermore, since $f(v) := \frac{1}{2}(v - v_\eta)^2$ is a strongly convex function and $\nabla f(v) = v - v_\eta$, by first order optimality condition, one obtains $$\nabla f(v_\eta^*)(v - v_\eta^*) = (v_\eta^* - v_\eta)(v - v_\eta^*) \geq 0,$$

$$\forall v \in \left[-\frac{C_{max}}{1-\gamma}, \frac{C_{max}}{1-\gamma}\right]$$

where $v_\eta^*$ is an unique projection of $v_\eta$ (the projection is unique because $f(v)$ is strongly convex and $$\left[-\frac{C_{max}}{1-\gamma}, \frac{C_{max}}{1-\gamma}\right]$$

is a convex compact set). Since the projection (minimizer) is unique, the above equality holds if and only if $v=v_\eta^*$.

Therefore, for any $$v \in \left[-\frac{C_{max}}{1-\gamma}, \frac{C_{max}}{1-\gamma}\right]$$

and $\eta > 0$.

$$g(v)Y_v[-g(v)] = g(v)\left(\lim_{0<\eta\to 0}\frac{v_\eta^*-v}{\eta}\right) = \left(\lim_{0<\eta\to 0}\frac{v-v_\eta}{\eta}\right)\left(\lim_{0<\eta\to 0}\frac{v_\eta^*-v}{\eta}\right) =$$

$$\lim_{0<\eta\to 0}\frac{-\|v_\eta^*-v\|^2}{\eta^2} + \lim_{0<\eta\to 0}(v_\eta^*-v_\eta)\left(\frac{v_\eta^*-v}{\eta^2}\right) \le 0.$$

Second, for any $g(v) \in \partial_v L(\theta,v,\lambda) \cap \mathcal{G}(v)^c$, one obtains $$v - ng(v) \in \left[-\frac{C_{max}}{1-\gamma}, \frac{C_{max}}{1-\gamma}\right],$$

for any $\eta \in (0,\eta_0]$ and some $\eta_0 > 0$. In this case, the arguments follow from case 2 and the following expression holds, $Y_v[-g(v)]=-g(v)$.

Combining these arguments, one concludes that $$\max_{g(v)} D_t L(\theta,v,\lambda) \le \max\{\max\{g(v)Y_v[-g(v)]\} \mid g(v) \in \mathcal{G}(v)\}, \quad (24)$$

$$\max\{-g^2(v) \mid g(v) \in \partial_v L(\theta,v,\lambda) \cap \mathcal{G}(v)^c\} \le 0.$$

This quantity is non-zero whenever $0 \notin \{g(v)Y_v[-g(v)] \mid \forall g(v) \in \partial_v L(\theta,v,\lambda)\}$ (this is because, for any $g(v) \in \partial_v L(\theta,v,\lambda) \cap \mathcal{G}(v)^c$, one obtains $g(v)Y_v[-g(v)]=-g(v)^2$).

Thus, by similar arguments one may conclude that $\max_{g(v)} D_t L(\theta,v,\lambda) \le 0$ and it is non-zero if $Y_v[-g(v)] \ne 0$ for every $g(v) \in \partial_v L(\theta,v,\lambda)$.

Now for any given $\theta$ and $\lambda$, define the following Lyapunov function $$\mathcal{L}_{\theta,\lambda}(v) = L(\theta,v,\lambda) - L(\theta,v^*,\lambda)$$

where $v^*$ is a minimum point (for any given $(\theta,\lambda)$, L is a convex function in v). Then $\mathcal{L}_{\theta,\lambda}(v)$ is a positive definite function, i.e., $\mathcal{L}_{\theta,\lambda}(v) \ge 0$. On the other hand, by definition of a minimum point, one easily obtains $0 \in \{g(v^*)Y_v[-g(v^*)]\mid_{v=v^*} \mid \forall g(v^*) \in \partial_v L(\theta,v,\lambda)\mid_{v=v^*}\}$ which means that $v^*$ is also a stationary point, i.e., $v^* \in N_c$.

Note that $\max_{g(v)} D_t \mathcal{L}_{\theta,\lambda}(v) = \max_{g(v)} D_t L(\theta,v,\lambda) \le 0$ and this quantity is non-zero if $Y_v[-g(v)] \ne 0$ for every $g(v) \in \partial_v L(\theta,v,\lambda)$. Therefore, by Lyapunov theory for asymptotically stable differential inclusions, the above arguments imply that with any initial condition $v(0)$, the state trajectory $v(t)$ of Equation 15 converges to a stable stationary minimum point $v^*$, i.e., $L(\theta,v^*,\lambda) \le L(\theta,v(t),\lambda) \le L(\theta,v(0),\lambda)$ for any $t \ge 0$.

Based on previous analysis on stochastic approximation, the sequence $$v_i \in \left[-\frac{C_{max}}{1-\gamma}, \frac{C_{max}}{1-\gamma}\right]$$

converges almost surely to the solution of differential inclusion (Equation 15) which further converges almost surely to $v^* \in N_c$. Also, it can be easily seen that $N_c$ is a closed subset of the compact set $$\left[-\frac{C_{max}}{1-\gamma}, \frac{C_{max}}{1-\gamma}\right],$$

which is a compact set as well.

Step 2 (Convergence of $\theta$-Update):

Since $\theta$ converges in a faster time scale than $\lambda$, and $v$ converges faster than $\theta$, one can assume $\lambda$ as a fixed quantity and $v$ as a converged quantity $v^*(\theta)$ in the $\theta$-update. The $\theta$-update can be rewritten as a stochastic approximation, i.e., $$\theta_{i+1} = \Gamma_\theta(\theta_i + \zeta_2(i)(-\nabla_\theta L(\theta,v,\lambda)\mid_{\theta=\theta_i,v=v^*(\theta_i)} + \delta\theta_{i+1})), \quad (25)$$

Where $$\delta\theta_{i+1} = \nabla_\theta L(\theta,v,\lambda)\bigg|_{\theta=\theta_i,v=v^*(\theta_i)} - \frac{1}{N}\sum_{j=1}^N \nabla_\theta \log P_\theta(\xi_{j,i})\bigg|_{\theta=\theta_i} \quad (26)$$

$$D(\xi_{j,i}) - \frac{\lambda}{(1-\alpha)N}\sum_{j=1}^N \nabla_\theta \log P_\theta(\xi_{j,i})\bigg|_{\theta=\theta_i}$$

$$(D(\xi_{j,i}) - v^*(\theta_i))1\{D(\xi_{j,i}) \ge v^*(\theta_i)\}.$$

First, one can show that $\delta\theta_{i+1}$ is square integrable, i.e., $\mathbb{E}[\|\delta\theta_{i+1}\|^2 \mid \mathcal{F}_{\theta,i}] \le K_i(1+\|\theta_i\|^2)$ for some $K_i > 0$, where $\mathcal{F}_{\theta,i} = \sigma(\theta_m, \delta\theta_m, m \le i)$ is the filtration of $\theta_i$ generated by different independent trajectories. To see this, notice that $$\|\delta\theta_{i+1}\|^2 \le 2(\nabla_\theta L(\theta,v,\lambda)\mid_{\theta=\theta_i,v=v^*(\theta_i)})^2 +$$

$$\frac{2}{N^2}\left(\frac{C_{max}}{1-\gamma} + \frac{2\lambda C_{max}}{(1-\alpha)(1-\gamma)}\right)^2\left(\sum_{j=1}^N \nabla_\theta \log P_\theta(\xi_{j,i})\bigg|_{\theta=\theta_i}\right)^2 \le$$

$$2K_{1,i}(1+\|\theta_i\|^2) + \frac{2^N}{N^2}\left(\frac{C_{max}}{1-\gamma} + \frac{2\lambda_{max} C_{max}}{(1-\alpha)(1-\gamma)}\right)^2 +$$

$$\left(\sum_{j=1}^N \|\nabla_\theta \log P_\theta(\xi_{j,i})\mid_{\theta=\theta_i}\|^2\right) \le$$

$$2K_{1,i}(1+\|\theta_i\|^2) + \frac{2^N}{N^2}\left(\frac{C_{max}}{1-\gamma} + \frac{2\lambda_{max} C_{max}}{(1-\alpha)(1-\gamma)}\right)^2\left(\sum_{j=1}^N K_2(\xi_{j,i})(1+\|\theta_i\|^2)\right) \le$$

$$2\left(K_{1,i} + \frac{2^{N-1}}{N}\left(\frac{C_{max}}{1-\gamma} + \frac{2\lambda_{max} C_{max}}{(1-\alpha)(1-\gamma)}\right)^2 \max_{1\le j\le N} K_2(\xi_{j,i})\right)(1+\|\theta_i\|^2)$$

The Lipschitz upper bounds are due to results in Remark 3. Since $K_2(\xi_{j,i}) < \infty$ w.p. 1, there exists $K_{2,i} < \infty$ such that $\max_{1\le j\le N} K_2(\xi_{j,i}) \le K_{2,i}$. By combining these results, one concludes that $\mathbb{E}[\|\delta f_{i+1}\|^2 \mid \mathcal{F}_{\theta,i}] \le K_i(1+\|\theta_i\|^2)$ where Second, since the history trajectories are generated based on the sampling probability $$K_i = 2\left(K_{1,i} + \frac{2^{N-1}K_{2,i}}{N}\left(\frac{C_{max}}{1-\gamma} + \frac{2\lambda_{max}C_{max}}{(1-\alpha)(1-\gamma)}\right)^2\right) < \infty$$

mass function $\mathbb{P}_\theta(\xi)$, Equation 5 implies that $\mathbb{E}[\delta\theta_{i+1} | F_{\theta,i}]=0$. Therefore, the $\theta$-update is a stochastic approximation of the ordinary differential equation 16 with a Martingale difference error term. In addition, from the convergence analysis of $v$-update, $v^*(\theta)$ is an asymptotically stable equilibrium point of $\{v_i\}$. From Equation 6, $\theta_v L(\theta,v,\lambda)$ is a Lipschitz set-valued mapping in $\theta$ (since $\mathbb{P}_\theta(\xi)$ is Lipschitz in $\theta$), it can be seen that $v^*(\theta)$ is a Lipschitz continuous mapping of $\theta$.

Now consider the continuous time system $\theta \in \Theta$ in Equation 16. The following can be expressed:

$$\frac{dL(\theta, v, \lambda)}{dt}\bigg|_{v=v^*(\theta)} = (\nabla_\theta L(\theta, v, \lambda)|_{v=v^*(\theta)})^T Y_\theta[-\nabla_\theta L(\theta, v, \lambda)|_{v=v^*(\theta)}]. \quad (27)$$

Consider the following cases:
Case 1:
When $\theta \in \Theta^\circ$. Since $\Theta^\circ$ is the interior of the set $\Theta$ and $\Theta$ is a convex compact set, there exists a sufficiently small $\eta_0>0$ such that $\theta-\eta_0 \nabla_\theta L(\theta,v,\lambda)|_{v=v^*(\theta)} \in \Theta$ and Therefore, the definition of $Y_\theta[-\nabla_\theta L(\theta,v,\lambda)|_{v=v^*(\theta)}]$ implies $$\frac{dL(\theta, v, \lambda)}{dt}\bigg|_{v=v^*(\theta)} = \|\nabla_\theta L(\theta, v, \lambda)|_{v=v^*(\theta)}\|^2 \leq 0. \quad (28)$$

At the same time, $dL(\theta,v,\lambda)/dt|_{v=v^*(\theta)}<0$ whenever $\|\nabla_\theta L(\theta,v,\lambda)|_{v=v^*(\theta)}\| \neq 0$.
Case 2:
When $\theta \in \partial\Theta$ and $\theta-\eta \nabla_\theta L(\theta,v,\lambda)|_{v=v^*(\theta)} \in \Theta$ for any $\eta \in (0,\eta_0]$ and some $\eta_0>0$. The condition $\theta-\eta \nabla_\theta L(\theta,v,\lambda)|_{v=v^*(\theta)} \in \Theta$ implies that
Then the following obtains $Y_\theta[-\nabla_\theta L\theta,v,\lambda|_{v=v^*(\theta)}]=-\nabla_\theta L\theta,v,\lambda|_{v=v^*(\theta)}.$ Then the following obtains $$\frac{dL(\theta, v, \lambda)}{dt}\bigg|_{v=v^*(\theta)} = -\|\nabla_\theta L(\theta, v, \lambda)|_{v=v^*(\theta)}\|^2 \leq 0. \quad (29)$$

Furthermore, $dL(\theta,v,\lambda)/dt|_{v=v^*(\theta)}<0$ when $\|\nabla_\theta L(\theta,v,\lambda)|_{v=v^*(\theta)}\| \neq 0$.
Case 3:
When $\theta \in \partial\Theta$ and $\theta-\eta \nabla_\theta L(\theta,v,\lambda)|_{v=v^*(\theta)} \notin \Theta$ for some $\eta \in (0,\eta_0]$ and any $\eta_0>0$. For any $\eta>0$, define $\theta_\eta:=\theta-\eta \nabla_\theta L(\theta,v,\lambda)|_{v=v^*(\theta)}$. The above condition implies that when $0<\eta\to 0$, $\Gamma_\theta[\theta_\eta]$ is the projection of $\theta_\eta$ to the tangent space of $\Theta$. For any elements $\hat{\theta} \in \Theta$, since the following set $\{\theta \in \Theta: \|\theta-\theta_\eta\|_2 \leq \|\hat{\theta}-\theta_\eta\|_2\}$ is compact, the projection of $\theta_\eta$ on $\Theta$ exists. Furthermore, since $f(\theta):=\frac{1}{2}\|\theta-\theta_\eta\|_2^2$ is a strongly convex function and $\nabla f(\theta)=\theta-\theta_\eta$, by first order optimality condition, one obtains $\nabla f(\theta_\eta^*)^T(\theta-\theta D^*)=(\theta_\eta^*-\eta_\eta)^T(\theta-\theta^{\eta*}) \geq 0, \forall \theta \in \Theta$ where $\theta_\eta^*$ is an unique projection of $\theta_\eta$ (the projection is unique because $f(\theta)$ is strongly convex and $\Theta$ is a convex compact set). Since the projection (minimizer) is unique, the above equality holds if and only if $\theta=\theta_\eta^*$.

Therefore, for any $\theta \in \Theta$ and $\eta>0$, $$(\nabla_\theta L(\theta, v, \lambda)|_{v=v^*(\theta)})^T Y_\theta[-\nabla_\theta L(\theta, v, \lambda)|_{v=v^*(\theta)}] =$$

$$(\nabla_\theta L(\theta, v, \lambda)|_{v=v^*(\theta)})^T \left(\lim_{0<\eta\to 0}\frac{\theta_\eta^*-\theta}{\eta}\right) = \left(\lim_{0<\eta\to 0}\frac{\theta-\theta_\eta}{\eta}\right)^T \left(\lim_{0<\eta\to 0}\frac{\theta_\eta^*-\theta}{\eta}\right) =$$

$$\lim_{0<\eta\to 0}\frac{-\|\theta_\eta^*-\theta\|^2}{\eta^2} + \lim_{0<\eta\to 0}(\theta_\eta^*-\theta)^T\left(\frac{\theta_\eta^*-\theta}{\eta^2}\right) \leq 0.$$

From these arguments, one concludes that $dL(\theta,v,\lambda)/dt|_{v=v^*(\theta)} \leq 0$ and this quantity is non-zero whenever $\|Y_\theta[-\nabla_\theta L(\theta,v,\lambda)|_{v=v^*(\theta)}]\| \neq 0$.

Now for any given $\lambda$, define the following Lyapunov function $\mathcal{L}_\lambda(\theta)=L(\theta,v^*(\theta),\lambda)-L(\theta^*,v^*(\theta^*),\lambda)$ where $\theta^*$ is a local minimum point. Then there exists a ball centered at $\theta^*$ with radius $r$ such that for any $\theta \in B_{\theta^*}(r)$, $\mathcal{L}_\lambda(\theta)$ is a locally positive definite function, i.e., $\mathcal{L}_\lambda(\theta) \geq 0$. On the other hand, by the definition of a local minimum point, one obtains $Y_\theta[-\nabla_\theta L(\theta^*,v,\lambda)|_{v=v^*(\theta)}]|_{\theta=\theta^*}=0$ which means that $\theta^*$ is a stationary point, i.e., $\theta^* \in \Theta_c$.

Note that $d\mathcal{L}_\lambda(\theta(t)/dt=dL(\theta(t),v^*(\theta(t)),\lambda)/dt \leq 0$ and the time-derivative is non-zero whenever $\|Y_\theta[-\nabla_\theta L(\theta,v,\lambda)|_{v=v^*(\theta)}]\| \neq 0$. Therefore, by Lyapunov theory for asymptotically stable systems, the above arguments imply that with any initial condition $\theta(0) \in B_{\theta^*}(r)$, the state trajectory $\theta(t)$ of Equation 16 converges to a stable stationary and local minimum $\theta^*$, i.e., $L(\theta^*,v^*(\theta^*),\lambda) \leq L(\theta(t),v^*(\theta(t)),\lambda) \leq L(\theta(0),v^*(\theta(0)),\lambda)$ for any $t \geq 0$.

Based on the above properties and noting that 1) from Proposition 1, $\nabla_\theta L(\theta,v,\lambda)$ is a Lipschitz function in $\theta$, 2) the step-size rule follows from Assumptions 1 to 3 (and corresponding discussion), 3) Equation 31 (below) implies that $\delta\theta_{i+1}$ is a square integrable Martingale difference, and 4) $\theta_i \in \Theta$, $\forall_i$ implies that $\sup_i\|\theta_i\|<\infty$ almost surely, one can invoke Theorem 2 in Chapter 6 of V. Borkar, *Stochastic Approximation*, supra, (addressing multi-time scale stochastic approximation theory), to show that the sequence $\{\theta_i\}$, $\theta_i \in \Theta$ converges almost surely to the solution of ordinary differential equation 16 which further converges almost surely to $\theta^* \in \Theta$. Also, it can be easily seen that $\Theta_c$ is a closed subset of the compact set $\Theta$, which is a compact set as well.

Step 3 (Local Minimum):
Now, it is desirable to show that $\{\theta_i, v_i\}$ converges to a local minimum of $L(\theta,v,\lambda)$ for fixed $\lambda$. Recall $\{\theta_i, v_i\}$ converges to $(\theta^*, v^*):=(\theta^*,v^*(\theta^*))$. From previous arguments on $(v,\theta)$ convergence analysis imply that with any initial condition $(\theta(0),v(0))$, the state trajectories $\theta(t)$ and $v(t)$ of Equations 15 and 16 converge to the set of stationary points $(\theta^*,v^*)$ in the positive invariant set $\Theta_c \times N_c$ and $L(\theta^*,v^*,\lambda) \leq L(\theta(t),v^*(\theta(t)),\lambda) \leq L(\theta(0),v^*(\theta(0)),\lambda) \leq L(\theta(0),v(t),\lambda) \leq L(\theta(0),v(0),\lambda)$ for any $t \geq 0$.

By contradiction, suppose $(\theta^*,v^*)$ is not a local minimum. Then there exists $$(\bar{\theta}, \bar{v}) \in \Theta \times \left[-\frac{C_{max}}{1-\gamma}, \frac{C_{max}}{1-\gamma}\right] \cap B_{(\theta^*,v^*)}(r)$$

such that $$L(\bar{\theta}, \bar{v}, \lambda) = \min_{(\theta,v) \in \Theta \times [-\frac{C_{max}}{1-\gamma}, \frac{C_{max}}{1-\gamma}] \cap B_{(\theta^*,v^*)}(r)} L(\theta, v, \lambda).$$

The minimum is attained by Weierstrass extreme value theorem. By putting $\theta(0)=\bar{\theta}$, the above arguments imply that $$L(\bar{\theta}, \bar{v}, \lambda) = \min_{(\theta,v)\in\Theta\times\left[-\frac{C_{max}}{1-\gamma}, \frac{C_{max}}{1-\gamma}\right]\cap B_{(\theta^*,v^*)}(r)} L(\theta, v, \lambda) < L(\theta^*, v^*, \lambda) \leq L(\bar{\theta}, \bar{v}, \lambda)$$

which is clearly a contradiction. Therefore, the stationary point $(\theta^*,v^*)$ is a local minimum of $L(\theta,v,\lambda)$ as well.

Step 4 (Convergence $\lambda$-Update):

Since $\lambda$-update converges in the slowest time scale, it can be rewritten using the converged $\theta^*(\lambda)=\theta^*(v^*(\lambda),\Delta)$ and $v^*(\lambda)$, i.e., $$\lambda_{i+1} = \Gamma_\lambda(\lambda_i + \zeta_1(i)(\nabla_\lambda L(\theta, v, \lambda)|_{\theta=\theta^*(\lambda_i),v=v^*(\lambda_i),\lambda=\lambda_i} + \delta\lambda_{i+1})) \quad (30)$$

where $$\delta\lambda_{i+1} = -\nabla_\lambda L(\theta, v, \lambda)\bigg|_{\theta=\theta^*(\lambda),v=v^*(\lambda),\lambda=\lambda_i} + \left(v*(\lambda_i) + \frac{1}{1-\alpha}\frac{1}{N}\sum_{j=1}^N (D(\xi_{j,i}) - v*(\lambda_i))^+ - \beta\right) \quad (31)$$

From Equation 7 it obvious that $\nabla_\lambda L(\theta,v,\lambda)$ is a constant function of $\lambda$. Similar to $\theta$-update, one can easily show that $\delta\lambda_{i+1}$ is square integrable, i.e., $$\mathbb{E}[\|\delta\lambda_{i+1}\|^2|\mathcal{F}_{\lambda,i}] \leq 2\left(\beta + \frac{3C_{max}}{(1-\gamma)(1-\alpha)}\right)^2.$$

where $\mathcal{F}_{\lambda,i}=\sigma(\lambda_m,\delta\lambda_m, m\leq i)$ is the filtration of $\lambda$ generated by different independent trajectories. Furthermore, Equation 7 implies that $\mathbb{E}[\delta\lambda_{i+1}|\mathcal{F}_{\lambda,i}]=0$. Therefore, the $\lambda$-update is a stochastic approximation of the ordinary differential equation 18 with a Martingale difference error term. In addition, from the convergence analysis of $(\theta,v)$-update, $(\theta^*(\lambda),v^*(\lambda))$ is an asymptotically stable equilibrium point of $\{\theta_i,v_i\}$. From Equation 5, $\nabla_\theta L(\theta,v,\lambda)$ is a linear mapping in $\lambda$, it can be easily seen that $(\theta^*(\lambda),v^*(\lambda))$ is a Lipschitz continuous mapping of $\lambda$.

Consider the ordinary differential equation of $\lambda\in[0,\lambda_{max}]$ in Equation 18. Analogous to the arguments in the $\theta$-update, it can be written $$\frac{d(-L(\theta,v,\lambda))}{dt}\bigg|_{\theta=\theta^*(\lambda),v=v^*(\lambda)} = -\nabla_\lambda L(\theta,v,\lambda)|_{\theta=\theta^*(\lambda),v=v^*(\lambda)}\Upsilon_\lambda[\nabla_\lambda L(\theta,v,\lambda)|_{\theta=\theta^*(\lambda),v=v^*(\lambda)}]$$

and shown that $-dL(\theta,v,\lambda)/dt|_{\theta=\theta^*(\lambda),v=v^*(\lambda)}\leq 0$, this quantity is non-zero whenever $\|\Upsilon_\lambda[dL(\theta,v,\lambda)/d\lambda|_{\theta=\theta^*(\lambda),v=v^*(\lambda)}]\|\neq 0$.

Consider the Lyapunov function $$\mathcal{L}(\lambda)=-L(\theta^*(\lambda),v^*(\lambda),\lambda)+L(\theta^*(\lambda),v^*(\lambda^*),\lambda^*)$$

where $\lambda^*$ is a local maximum point. Then there exists a ball centered at $\lambda^*$ with radius r such that for any $\lambda\in B_{\lambda^*}(r)$, $\mathcal{L}(\lambda)$ is a locally positive definite function, i.e., $\mathcal{L}(\lambda)\geq 0$. On the other hand, by the definition of a local maximum point, one obtains $\Upsilon_\lambda[dL(\theta,v,\lambda)/d\lambda|_{\theta=\theta^*(\lambda),v=v^*(\lambda),\lambda=\lambda^*}]|_{\lambda=\lambda^*}0$ which means that $\lambda^*$ is also a stationary point, i.e., $\lambda^*\in\Lambda_c$.

Since $d\mathcal{L}(\lambda(t))/dt=-dL(\theta^*(\lambda(t)),v^*(\lambda(t)),\lambda(t))/dt\leq 0$ and the time-derivative is non-zero whenever $\|\Upsilon_\lambda[\nabla_\lambda L(\theta,v,\lambda)|_{v=v^*(\lambda),\theta=\theta^*(\lambda)}]\|\neq 0$, Lyapunov theory for asymptotically stable systems implies that $\lambda(t)$ converges to $\lambda^*$ and $\lambda^*$ is asymptotically stable stationary and local maximum point.

Based on the above properties and noting that the step size rule follows from Assumptions 1 to 3 (and corresponding discussion), one can apply the multi-time scale stochastic approximation theory (Theorem 2 in Chapter 6 of V. Borkar, *Stochastic Approximation*, supra) to show that the sequence $\{\lambda_i\}$ converges almost surely to the solution of ordinary differential equation 18 which further converges almost surely to $\lambda^*\in[0,\lambda_{max}]$. Since $[0,\lambda_{max}]$ is a compact set, following the same lines of arguments and recalling the envelope theorem (Theorem 3) for local optimum, on further concludes that $\lambda^*$ is a local maximum of $L(\theta^*(\lambda),v^*(\lambda),\lambda)=L^*(\lambda)$.

Step 5 (Saddle Point):

By letting $\theta^*=\theta^*(v^*(\lambda^*),\lambda^*)$ and $v^*=v^*(\lambda^*)$, it can be shown that $(\theta^*,v^*,\lambda^*)$ is a (local) saddle point of the objective function $L(\theta,v,\lambda)$ if $\lambda^*\in[0,\lambda_{max})$.

Now suppose the sequence $\{\lambda_i\}$ generated from Equation 30 converges to a stationary point $\lambda^*\in[0,\lambda_{max})$. Since step 3 implies that $(\theta^*,v^*)$ is a local minimum of $L(\theta,v,\lambda^*)$ over feasible set $$(\theta, v) \in \Theta \times \left[-\frac{C_{max}}{1-\gamma}, \frac{C_{max}}{1-\gamma}\right],$$

there exists a $r>0$ such that $$L(\theta^*, v^*, \lambda^*) \leq L(\theta, v, \lambda^*), \forall (\theta, v) \in \Theta \times \left[-\frac{C_{max}}{1-\gamma}, \frac{C_{max}}{1-\gamma}\right] \cap B_{(\theta^*,v^*)}(r)$$

In order to complete the proof it is necessary to show $$v^* + \frac{1}{1-\alpha}\mathbb{E}[(D^{\theta^*}(x^0) - v^*)^+] \leq \beta, \quad (32)$$

and $$\lambda^*\left(v^* + \frac{1}{1-\alpha}\mathbb{E}[D^{\theta^*}(x^0) - v^*)^+] - \beta\right) = 0. \quad (33)$$

These two equations imply $$L(\theta^*, v^*, \lambda^*) = V^{\theta^*}(x^0) + \lambda^*\left(v^* + \frac{1}{1-\alpha}\mathbb{E}[(D^{\theta^*}(x^0) - v^*)^+] - \beta\right) =$$

$$V^{\theta^*}(x^0) \geq V^{\theta^*}(x^0) + \lambda\left(v^* + \frac{1}{1-\alpha}\mathbb{E}[(D^{\theta^*}(x^0) - v^*)^+] - \beta\right) =$$

$$L(\theta^*, v^*, \lambda^*),$$

which further implies $(\theta^*,v^*,\lambda^*)$ is a saddle point of $L(\theta,v,\lambda)$. It can now be shown that Equations 32 and 33 hold.

Recall that $\Upsilon_\lambda[\nabla_\lambda L(\theta,v,\lambda)|_{\theta=\theta^*(\lambda),v=v^*(\lambda),\lambda=\lambda^*}]|_{\lambda=\lambda^*}=0$. We show Equation 32 by contradiction. Suppose $$v^* + \frac{1}{1-\alpha}\mathbb{E}[D^{\theta^*}(x^0) - v^*)^+] > \beta.$$

This then implies that for $\lambda^* \in [0, \lambda_{max})$, $$\Gamma_\lambda\left(\lambda^* - \eta\left(\beta - \left(v^* + \frac{1}{1-\alpha}\mathbb{E}\left[(D^{\theta^*}(x^0) - v^*)^+\right]\right)\right)\right) =$$

$$\lambda^* - \eta\left(\beta - \left(v^* + \frac{1}{1-\alpha}\mathbb{E}\left[(D^{\theta^*}(x^0) - v^*)^+\right]\right)\right)$$

for any $\eta \in [0, \eta_{max})$ for some sufficiently small $\eta_{max} > 0$. Therefore, $$\Upsilon_\lambda[\nabla_\lambda L(\theta, v, \lambda)|_{\theta=\theta^*(\lambda), v=v^*(\lambda), \lambda=\lambda^*}]|_{\lambda=\lambda^*} =$$

$$v^* + \frac{1}{1-\alpha}\mathbb{E}\left[(D^{\theta^*}(x^0) - v^*)^+\right] - \beta > 0.$$

This contradicts with $\Upsilon_\lambda[\nabla_\lambda L(\theta,v,\lambda)|_{\theta=\theta^*(\lambda),v=v^*(\lambda),\lambda=\lambda^*}]|_{\lambda=\lambda^*}=0$. Therefore, Equation 32 holds. To show that Equation 33 holds, it is only necessary to show that $\lambda^*=0$ if $$v^* + \frac{1}{1-\alpha}\mathbb{E}\left[(D^{\theta^*}(x^0) - v^*)^+\right] < \beta.$$

Suppose $\lambda^* \in (0, \lambda_{max})$, then there exists a sufficiently small $\lambda_0 > 0$ such that $$\frac{1}{\eta_0}\left(\Gamma_\lambda\left(\lambda^* - \eta_0\left(\beta - \left(v^* + \frac{1}{1-\alpha}\mathbb{E}\left[(D^{\theta^*}(x^0) - v^*)^+\right]\right)\right)\right) - \Gamma_\lambda(\lambda^*)\right) =$$

$$v^* + \frac{1}{1-\alpha}\mathbb{E}\left[(D^{\theta^*}(x^0) - v^*)^+\right] - \beta < 0.$$

This again contradicts with the assumption $\Upsilon_\lambda[\nabla_\lambda L(\theta,v,\lambda)|_{\theta=\theta^*(\lambda),v=v^*(\lambda),\lambda=\lambda^*}]|_{\lambda=\lambda^*}=0$. Therefore, Equation 33 holds.

Combining the above arguments, the final conclusion results that $(\theta^*, v^*, \lambda^*)$ is a (local) saddle point of $L(\theta, v, \lambda)$ if $\lambda^* \in [0, \lambda_{max})$.

Remark 4:

When $\lambda^* = \lambda_{max}$ and $$v^* + \frac{1}{1-\alpha}\mathbb{E}\left[(D^{\theta^*}(x^0) - v^*)^+\right] < \beta,$$

$$\Gamma_\lambda\left(\lambda^* - \eta\left(\beta - \left(v^* + \frac{1}{1-\alpha}\mathbb{E}\left[(D^{\theta^*}(x^0) - v^*)^+\right]\right)\right)\right) = \lambda_{max}$$

For any $\eta > 0$ and $\Upsilon_\lambda[\nabla_\lambda L(\theta,v,\lambda)|_{\theta=\theta^*(\lambda),v=v^*(\lambda),\lambda=\lambda^*}]|_{\lambda=\lambda^*}=0$. In this case one cannot guarantee feasibility using the above analysis, and $(\theta^*, v^*, \lambda^*)$ is not a local saddle point. Such $\lambda^*$ is referred as a spurious fixed point. Practically by incrementally increasing $\lambda_{max}$, when $\lambda_{max}$ becomes sufficiently large, one can ensure that the policy gradient algorithm will not get stuck at the spurious fixed point.

Adobe Target Problem

One or more embodiments of the present disclosure can be used in conjunction with the set of programs known as Adobe Target®. As described above, these programs have historically used the Test & Target 1:1 optimization system to help marketers test different variations of websites and optimize the advertisement targets based on different types of visitors. This optimization system uses machine-learning, risk-neutral techniques to decide which content to show each visitor based on consumer background and preferences. One or more embodiments have been utilized to select ad recommendation policies in comparison to the Adobe Test & Target 1:1 simulator. For purposes of this comparison, the loss-tolerance and confidence interval values were set for $\beta=0.12$ and $\alpha=0.05$, respectively. Here, the cost is defined as minus reward, and thus in cost formulation the loss-tolerance and confidence interval values were set for $\beta=-0.12$ and $\alpha=0.95$, respectively. A stage-wise reward of 1 indicates that the user clicks the advertising content and zero otherwise. Therefore, the number of clicks on advertising content defined the long-term reward function. With a fixed time horizon of 15 steps (T=15), and discounting factor $\lambda=0.95$, the experimental results can be found in FIG. 6 and Table 1.

TABLE 1

Performance comparison for the policies learned by the risk-sensitive and risk-neutral algorithms in Adobe Target.

|  | $\mathbb{E}(R^\mu)(x^0)$ | $\sigma(R^\mu)(x^0)$ | $CVaR_\alpha(R^\mu)(x^0)$ |
| --- | --- | --- | --- |
| CVaR Constrained Optimization | 0.293 | 0.864 | 0.141 |
| Risk Neutral Optimization | 0.404 | 1.919 | 0.036 |

From Table 1, the mean reward is 0.404 in the risk-neutral policy gradient compared to the mean reward of 0.293 in mean-CVaR constrained policy gradient. This indicates that the mean reward is slightly higher for the risk-neutral policy. However, the CVaR value is 0.036 in risk-neutral policy gradient compared to the CVaR value of 0.141 in mean-CVaR constrained policy gradient. Because the CVaR value is higher, it indicates that the mean $\alpha$-tail is higher, and that the variance, or risk, is therefore lower. These results show that while the expected revenue obtained from the risk-neutral method is higher than that of its mean-CVaR constrained counterpart, it encounters a higher risk of returning a very low return.

Figure 6:
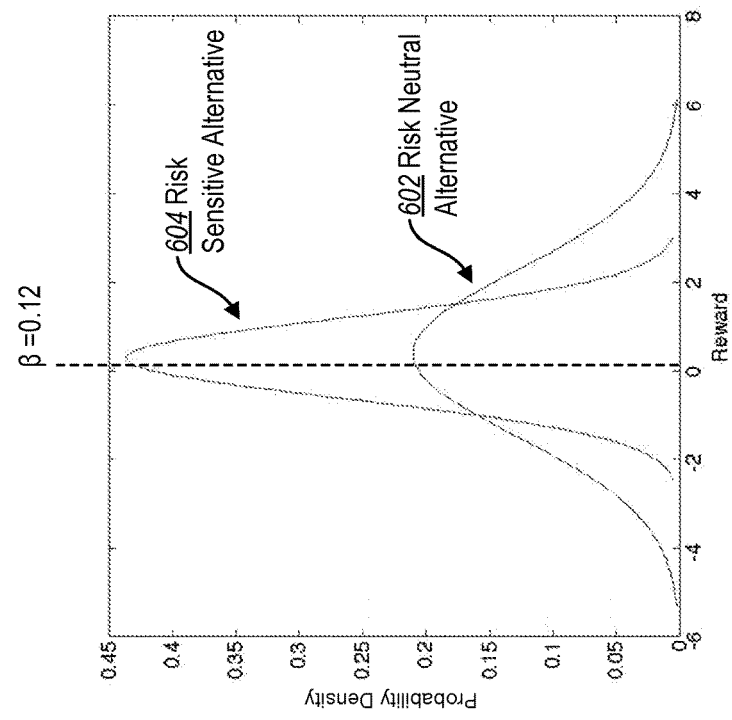
FIG. 6 illustrates return distributions for policies learned by the risk-sensitive and risk-neutral alternatives in an Adobe Target problem in accordance with one or more embodiments.
Figure 6:
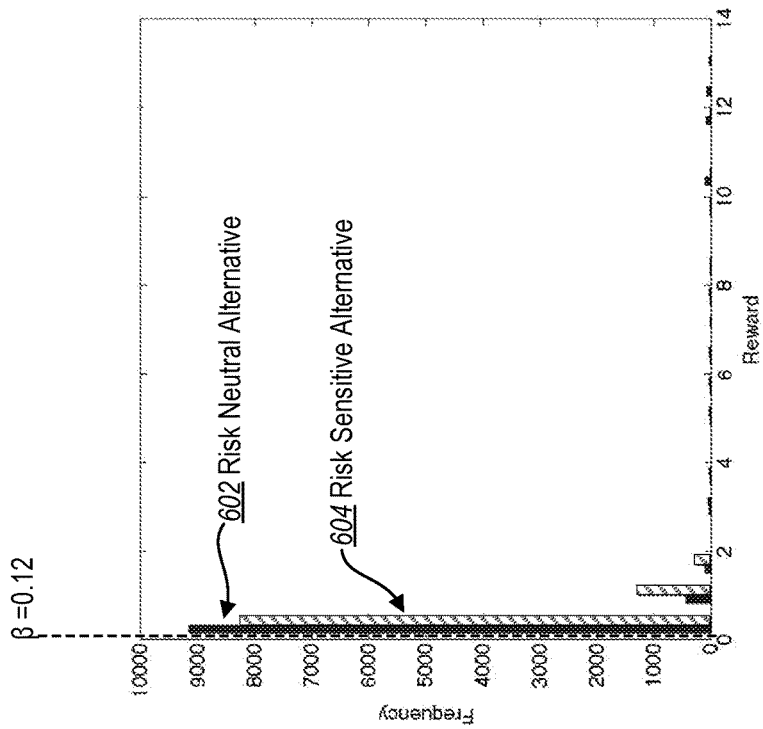

FIG. 6 confirms these results. FIG. 6 illustrates return distributions for policies learned by the risk-sensitive and risk-neutral alternatives in the Adobe Target problem. As illustrated, the return distributions for policies learned by risk-neutral alternatives 602 reflect a higher average return value, reflected by their position further to the right on the graph, and a higher variance, reflected by the width of the data. The return distributions for policies learned by risk-sensitive alternatives 604 reflect a lower average return value, and lower variance.

Stopping Problem

Furthermore, one or more embodiments of the disclosure can be utilized to provide other policy recommendations. For example, one embodiment has been utilized in conjunction with a recommendation for an investment-stopping problem. In this problem, the state at each time step $k \leq T$ consists of the cost $c_k$ and time k, i.e., $x=(c_k, k)$, where T is the stopping time. The agent (buyer) should decide either to accept the present cost or wait. The objective is to minimize the average price of an equity and control its worst-case loss distribution. If the buyer accepts, i.e., when k=T, the system reaches a terminal state and the cost $c_k$ is received, otherwise, the buyer receives the cost $p_h$ and the new state is $(c_{k+1}, k+1)$ where $c_{k+1}$ is $f_u c_k$ w.p. p and $f_d c_k$ w.p. 1−p. Here, $f_u > 1$ and $f_d < 1$ are constants. Moreover, there is a discounted factor $\gamma \in (0,1)$ to account for the increase in the buyer's affordability.

The stopping problem can be formulated as follows $\min_\theta \mathbb{E}(D^\theta(x^0))$ subject to $CVaR_\alpha(D^\theta(x^0)) \leq \beta$ where $D^\theta(x^0) = \Sigma_{k=0}^T \gamma^k (1\{\mu_k=1\}c_k + 1\{\mu_k=0\}p_h)|x_0=x, \mu$ This embodiment set the parameters of the MDP as follows in solving this particular stopping problem: $x_0=[2; 0]$, $p_h=0.1$, $T=20$, $\gamma=0.95$, $f_u=2$, $f_d=0.5$, and $p=0.35$ The step-length sequence was given as:

$$\zeta_1(i) = \frac{2}{i}, \zeta_2(i) = \frac{0.1}{i^{0.9}}, \zeta_3(i) = \frac{0.1}{i^{0.85}}, \forall i$$

The confidence level and risk-tolerance threshold were given by $\alpha=0.95$ and $\beta=3$. The number of sample trajectories N was set to 100. The parameter bounds were given as follows: $\lambda_{max}=1000$, $\Theta=[-60,60]^{K_1}$, and $C_{max}=64.15>x_0 \times f_u^T$ It will be appreciated that a near-optimal policy $\mu$ was obtained using the LSPI algorithm with 2-dimensional radial basis function (RBF) features. This embodiment also implemented the 2-dimensional RBF feature function $\phi$ and considered the family Boltzmann policies for policy parameterization:

$$\mu(a \mid x; \theta) = \frac{\exp(\theta^T \phi(x, a))}{\sum_{a' \in \mathcal{A}} \exp(\theta^T \phi(x, a'))}$$

This experiment implemented two trajectory-based algorithms (as described above), one that considered risk criteria, another that did not.

Figure 8:
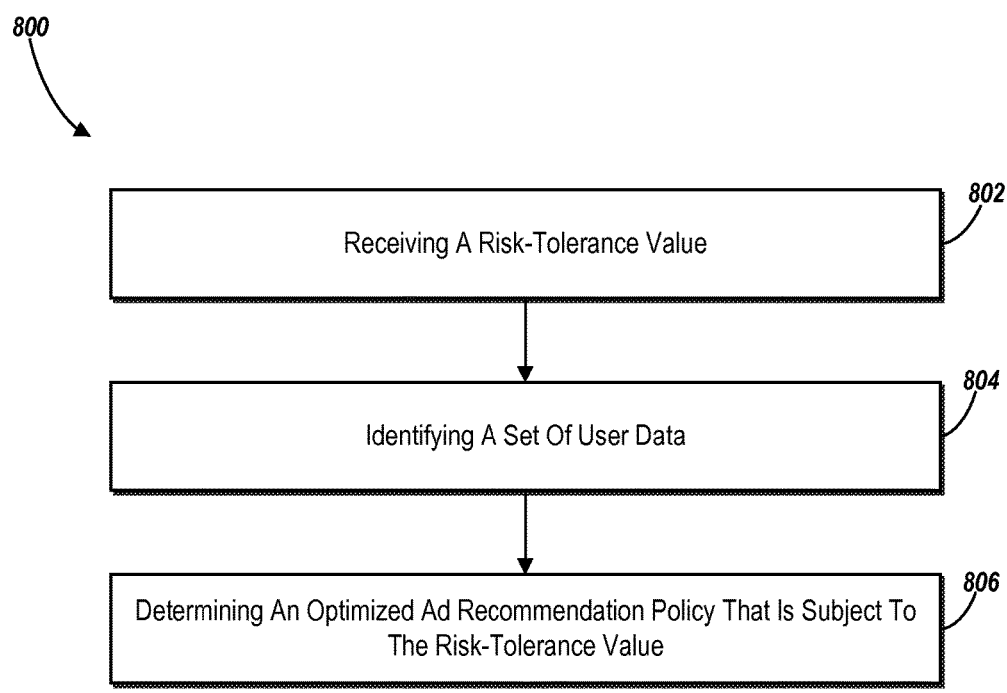
FIG. 8 illustrates a flowchart of a series of acts in a method of selecting an ad recommendation policy in accordance with one or more embodiments.

The experiments for each algorithm comprised of the following two phases:
1. Tuning phase: Here each iteration involved the simulation run with the nominal policy parameter θ where the run length for a particular policy parameter is at most T steps. This experiment ran the algorithm for 100 iterations and stopped when the parameter (θ,ν,λ) converged.
2. Converged run: Followed by the tuning phase, this experiment obtained the converged policy parameter θ*. In the converged run phase, the experiment performed simulation with this policy parameter for 10,000 runs where each simulation generated a trajectory of at most T steps. The results provided in Table 2 and FIG. 8 are averages over these iterations.

TABLE 2

Performance comparison for the policies learned by the risk-sensitive and risk-neutral algorithms in optimal stopping problem.

| | $\mathbb{E}(R^\mu)(x^0)$ | $\sigma(R^\mu)(x^0)$ | $CVaR_\alpha(R^\mu)(x^0)$ |
|---|---|---|---|
| CVaR Constrained Optimization | 1.84 | 0.57 | 2.25 |
| Risk Neutral Optimization | 1.35 | 1.04 | 4.45 |

From Table 2, one can see that the mean revenue of the policy returned by the risk-neutral policy gradient algorithm is 1.35, compared to the mean revenue of 1.84 for the policy returned by the mean-CVaR constrained policy gradient algorithm. Although the expected revenue obtained from risk-neutral policy gradient is higher (lower expected cost), it has a heavy-tailed distribution. This can be seen from the values of CVaR, which is 4.45 in the risk-neutral policy gradient and 2.25 in the mean-CVaR constrained policy gradient. This implies that the policy generated by the risk-neutral algorithm has a significant chance to return a very low return (high cost). Comparatively, by trading off some performance on maximizing the expected revenue, the return distribution from the mean-CVaR constrained method results in much smaller deviations (shorter tail).

Figure 7:
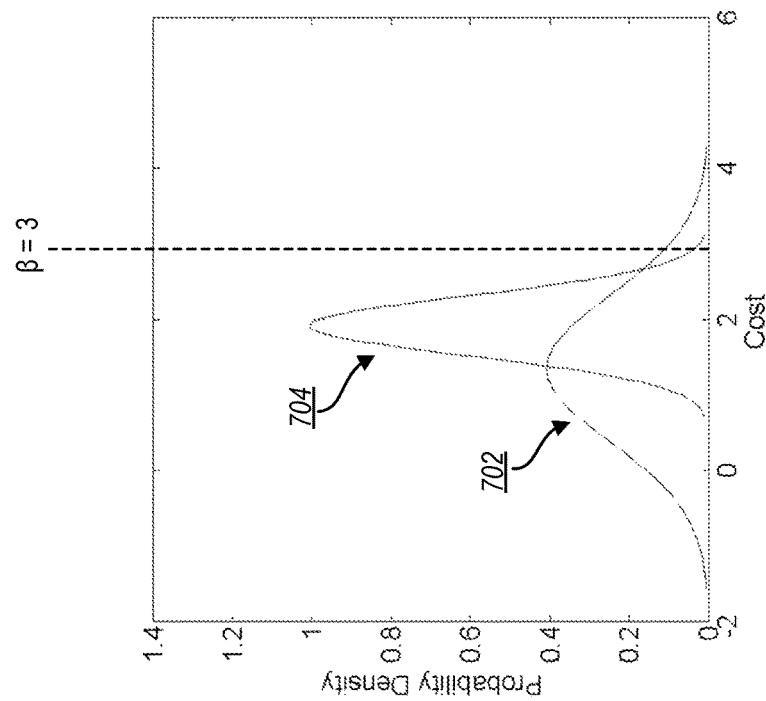
FIG. 7 illustrates return distributions for policies learned by the risk-sensitive and risk-neutral algorithms in an optimal stopping problem in accordance with one or more embodiments.
Figure 7:
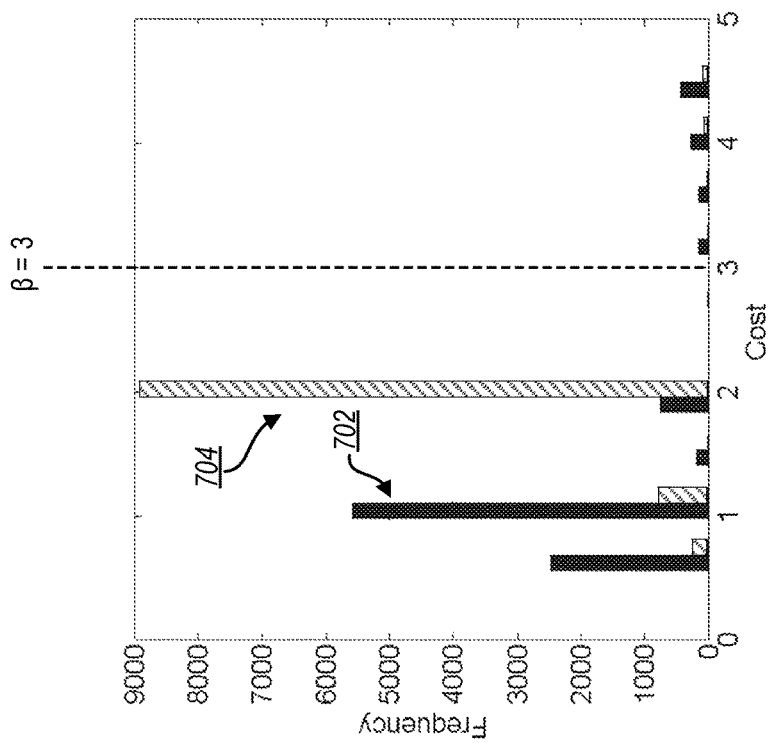

FIG. 7 confirms these results. FIG. 7 illustrates return distributions for policies learned by the risk-sensitive and risk-neutral algorithms in the optimal stopping problem. Unlike FIG. 6, FIG. 7 illustrates a return distribution of cost. Accordingly, a return further with a location further to the right on FIG. 7 indicates a higher cost (lower return), while a return with a location further to the left on FIG. 7 indicates a lower cost (higher return). As illustrated, the return distributions for policies learned by risk-neutral alternatives 702 reflect a higher average return value, reflected by their position to the left of the graph, and a higher variance, reflected by the width of the data. The return distributions for policies learned by risk-sensitive alternatives 704 reflect a lower average return value, and lower variance, or risk. Note that because the confidence level is relatively high, 0.95, a significantly smaller portion of the actual sample distribution falls below the risk-tolerance level.

Figure 9:
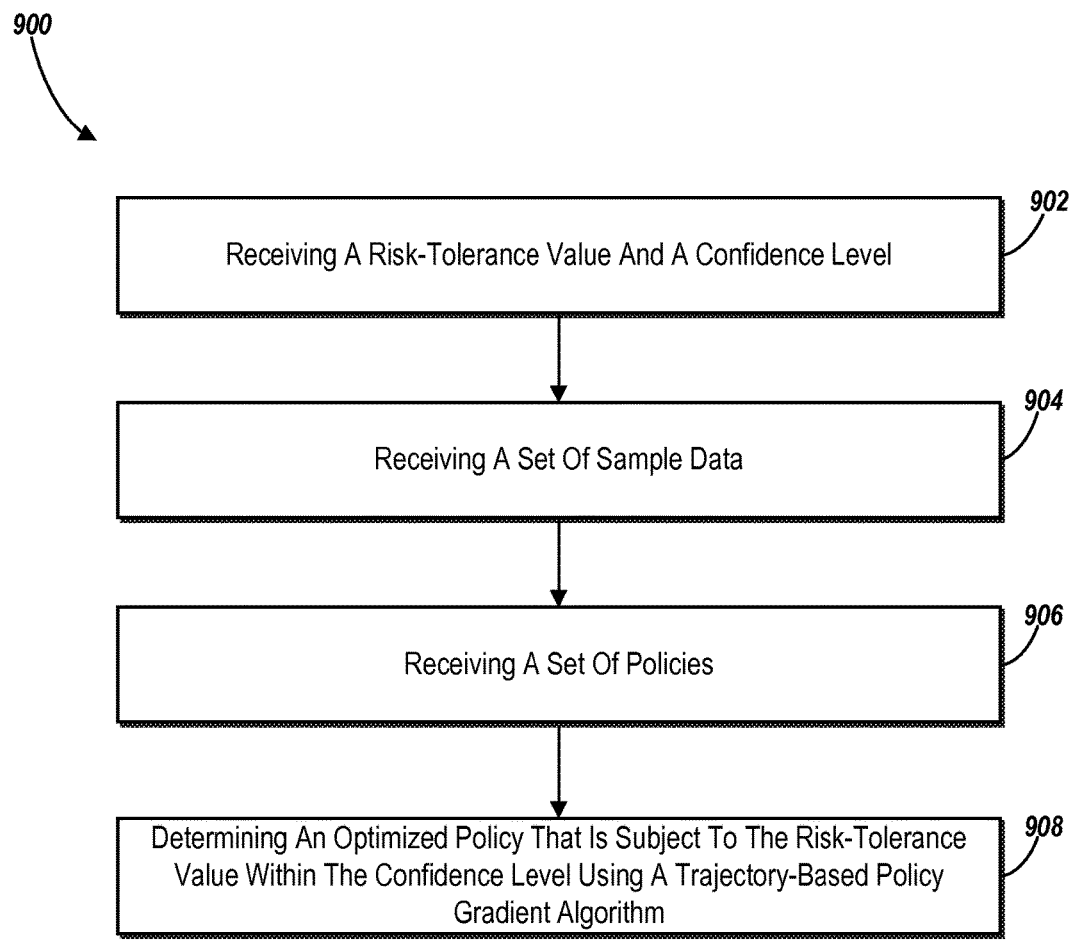
FIG. 9 illustrates a flowchart of a series of acts in a method of selecting an ad recommendation policy in accordance with one or more embodiments.

FIGS. 1-7, the corresponding text, and the examples, provide a number of different systems and devices for providing selecting an ad recommendation policy within a given risk tolerance at a given confidence level. In addition to the foregoing, one or more embodiments can also be described in terms of flowcharts comprising acts and steps in a method for accomplishing a particular result. For example, FIGS. 8 and 9 illustrate flowcharts of exemplary methods in accordance with one or more embodiments. The methods described in relation to FIGS. 8 and 9 may be performed with less or more steps/acts or the steps/acts may be performed in differing orders. Additionally, the steps/acts described herein may be repeated or performed in parallel with one another or in parallel with different instances of the same or similar steps/acts.

FIG. 8 illustrates a flowchart of one example method 800 of using risk-sensitive, lifetime value optimization to select ad recommendation policies. In particular, method 800 can be implemented in a digital medium environment (e.g., a digital ad serving environment) for identifying and deploying potential digital advertising campaigns, where campaigns can be altered, removed, or replaced on demand. In particular, method 800 can select an optimized ad recommendation policy that returns an advertisement to present on a webpage to a user with a given set of characteristics. The optimized ad recommendation policy can projects a click-thru rate less than an ad recommendation policy optimized for life-time value without regard to risk.

The method 800 includes an act 802 of receiving a risk-tolerance value β. In particular, act 802 can involve receiving a threshold tolerance value for an ad serving campaign. For example, act 802 can involve receiving a risk threshold that a marketer is willing to allow the ad serving campaign to perform. The risk-tolerance value β can comprise a variety of forms, including in a business outcome (such as revenue or sales), consumer behavior (such as clicks, selections, or purchases), a threshold click-thru rate, or a statistical measure (such as CVaR, standard deviations, value-at-risk, etc.). Act 802 can optionally involve receiving or identifying a confidence level α for the risk-tolerance value β. For example, act 802 can involve identifying a default value confidence level α, such as for example 95%. Alternatively, act 802 can involve receiving input from a marketer that adjusts the default confidence level α or otherwise provides the confidence level α.

The method 800 further includes an act 804 of identifying a set of user data. In particular, act 804 can involve identifying a set of user data indicating prior behavior in relation to advertising. For example, act 804 can involve accessing a set of user data from an analytics server. Alternatively, act 804 can involve gathering the set of user data via known analytic techniques, such as tracking pixels.

Additionally, the method includes an act 806 of determining an optimized ad recommendation policy that is subject to the risk-tolerance value. In particular, act 806 can involve determining an optimized ad recommendation policy $\mu$ that is subject to the risk-tolerance value $\beta$ by simultaneously converging a policy parameter $\theta$ and a risk parameter $\nu$ to identify the optimized ad recommendation policy $\mu$ that is subject to the risk-tolerance value $\beta$. For example, act 806 can involve repeatedly estimating a gradient for the policy parameter $\theta$ by sampling the set of user data. Additionally, act 806 can involve repeatedly estimating a gradient for the risk parameter $\nu$ by sampling the set of user data. Furthermore, act 806 can involve repeatedly using the estimated gradient for the risk parameter $\nu$ to select an updated risk parameter $\nu$. Act 806 can also involve repeatedly using the estimated gradient for the policy parameter $\theta$ to select an updated policy parameter $\theta$.

Act 806 can also involve simultaneously converging the policy parameter $\theta$, the risk parameter $\nu$, and a constraint parameter $\lambda$ to identify the optimized ad recommendation policy that is subject to the risk-tolerance value $\beta$. In particular, act 806 can involve repeatedly estimating a gradient for the constraint parameter $\lambda$ by sampling the set of user data.

As mentioned above, act 806 can involve determining an optimized ad recommendation policy $\mu$ that is subject to the risk-tolerance value $\beta$. In one or more embodiments, act 806 can involve determining an optimized ad recommendation policy that is subject to the risk-tolerance value $\beta$ within the confidence level $\alpha$. For example, act 806 can involve optimizing a conditional value-at risk for a Markov decision process. In particular, act 806 can involve using a policy gradient algorithm for the conditional value-at risk for the Markov decision process.

As part of estimating the gradient for the policy parameter $\theta$ by sampling the set of user data, act 806 can involve using the policy gradient algorithm to generate one or more trajectories for the policy parameter $\theta$ by following the policy parameter $\theta$ during sampling. Act 806 can further involve using the one or more trajectories to estimate the gradient for the policy parameter $\theta$. Act 806 can also involve applying projection operators when estimating the gradient for the policy parameter $\theta$ to ensure convergence. Act 806 can then involve using the estimated gradient of the policy parameter $\theta$ to select an updated policy parameter $\theta$ from a set of ad recommendation policies.

Along similar lines, as part of estimating the gradient for the risk parameter $\nu$ by sampling the set of user data, act 806 can involve using the policy gradient algorithm to generate one or more trajectories for the risk parameter $\nu$ by following the policy parameter $\theta$ during sampling. Act 806 can further involve using the one or more trajectories to estimate the gradient for the risk parameter $\nu$. Act 806 can also involve applying projection operators when estimating the gradient for the risk parameter $\nu$ to ensure convergence. Act 806 can then involve using the estimated gradient of the risk parameter $\nu$ to select an updated risk parameter $\nu$.

Still further, as part of estimating the gradient for the constraint parameter $\lambda$. by sampling the set of user data, act 806 can involve using the policy gradient algorithm to generate one or more trajectories for the constraint parameter $\lambda$. by following the policy parameter $\theta$ during sampling. Act 806 can further involve using the one or more trajectories to estimate the gradient for the constraint parameter $\lambda$. Act 806 can also involve applying projection operators when estimating the gradient for the constraint parameter $\lambda$. to ensure convergence. Act 806 can then involve using the estimated gradient of the constraint parameter $\lambda$ to select an updated constraint parameter $\lambda$.

In one or more embodiments, act 806 can involve converging the risk parameter $\nu$ at a first time scale, converging the policy parameter $\theta$ at a second time scale, and converging the constraint parameter $\lambda$ at a third time scale. The first time scale can be faster than the second time scale. Along related lines, the second time scale can be faster than the third time scale.

FIG. 9 illustrates a flowchart of another example method 900 of using risk-sensitive, lifetime value optimization to select a policy. In particular, method 900 can be implemented in a digital medium environment for identifying and deploying policies, where policies can be altered, removed, or replaced on demand. For example, the method 900 can involve solving an optimization of a conditional value-at risk for a Markov decision process. The method 900 includes an act 902 of receiving a risk-tolerance value $\beta$ and a confidence level $\alpha$. The risk-tolerance value $\beta$ can comprise a variety of forms, including in a business outcome (such as revenue or sales), consumer behavior (such as clicks, selections, or purchases), a threshold click-thru rate, or a statistical measure (such as CVaR, standard deviations, value-at-risk, etc.). Act 902 can involve identifying a default value confidence level $\alpha$, such as for example 95%. Alternatively, act 902 can involve receiving input that adjusts the default confidence level $\alpha$ or otherwise provides the confidence level $\alpha$.

The method 900 also includes an act 904 of receiving a set of sample data. In particular, act 904 can involve identifying a set of user data indicating prior behavior in relation to parameters of one or more policies. Furthermore, method 900 includes an act 906 of receiving a set of policies.

In addition to the foregoing, method 900 includes an act 908 of determining an optimized policy that is subject to the risk-tolerance value $\beta$ within the confidence level $\alpha$ using a trajectory-based policy gradient algorithm. For example, act 908 can involve simultaneously converging a policy parameter $\theta$, a risk parameter $\nu$, and a constraint parameter $\lambda$ by sampling the sample data to identify the optimized policy that is subject to the risk-tolerance value $\beta$ within the confidence level $\alpha$. More particularly, act 908 can involve for each of the policy parameter $\theta$, the risk parameter $\nu$, and the constraint parameter $\lambda$ repeatedly: generating one or more trajectories of a given parameter of the policy parameter, the risk parameter, or the constraint parameter by sampling the set of sample data; estimating, by the one or more processors, a gradient for the given parameter based on the generated one or more trajectories of the given parameter; and using the estimated gradient for the given parameter to update the given parameter.

Act 908 can also involve applying projection operators when estimating gradients for the policy parameter $\theta$, the risk parameter $\nu$, and the constraint parameter $\lambda$ to ensure convergence to the optimized policy that is subject to the risk-tolerance value within the confidence level.

In one or more embodiments, act 908 can involve converging the risk parameter $\nu$ at a first time scale, converging the policy parameter $\theta$ at a second time scale, and converging the constraint parameter $\lambda$ at a third time scale. The first time scale can be faster than the second time scale. Along related lines, the second time scale can be faster than the third time scale.

Embodiments of the present disclosure may comprise or utilize a special purpose or general-purpose computer including computer hardware, such as, for example, one or more processors and system memory, as discussed in greater detail below. Embodiments within the scope of the present disclosure also include physical and other computer-readable media for carrying or storing computer-executable instructions and/or data structures. In particular, one or more of the processes described herein may be implemented at least in part as instructions embodied in a non-transitory computer-readable medium and executable by one or more computing devices (e.g., any of the media content access devices described herein). In general, a processor (e.g., a microprocessor) receives instructions, from a non-transitory computer-readable medium, (e.g., a memory, etc.), and executes those instructions, thereby performing one or more processes, including one or more of the processes described herein.

Computer-readable media can be any available media that can be accessed by a general purpose or special purpose computer system. Computer-readable media that store computer-executable instructions are non-transitory computer-readable storage media (devices). Computer-readable media that carry computer-executable instructions are transmission media. Thus, by way of example, and not limitation, embodiments of the disclosure can comprise at least two distinctly different kinds of computer-readable media: non-transitory computer-readable storage media (devices) and transmission media.

Non-transitory computer-readable storage media (devices) includes RAM, ROM, EEPROM, CD-ROM, solid state drives ("SSDs") (e.g., based on RAM), Flash memory, phase-change memory ("PCM"), other types of memory, other optical disk storage, magnetic disk storage or other magnetic storage devices, or any other medium which can be used to store desired program code means in the form of computer-executable instructions or data structures and which can be accessed by a general purpose or special purpose computer.

A "network" is defined as one or more data links that enable the transport of electronic data between computer systems and/or modules and/or other electronic devices. When information is transferred or provided over a network or another communications connection (either hardwired, wireless, or a combination of hardwired or wireless) to a computer, the computer properly views the connection as a transmission medium. Transmissions media can include a network and/or data links which can be used to carry desired program code means in the form of computer-executable instructions or data structures and which can be accessed by a general purpose or special purpose computer. Combinations of the above should also be included within the scope of computer-readable media.

Further, upon reaching various computer system components, program code means in the form of computer-executable instructions or data structures can be transferred automatically from transmission media to non-transitory computer-readable storage media (devices) (or vice versa). For example, computer-executable instructions or data structures received over a network or data link can be buffered in RAM within a network interface module (e.g., a "NIC"), and then eventually transferred to computer system RAM and/or to less volatile computer storage media (devices) at a computer system. Thus, it should be understood that non-transitory computer-readable storage media (devices) can be included in computer system components that also (or even primarily) utilize transmission media.

Computer-executable instructions comprise, for example, instructions and data which, when executed at a processor, cause a general purpose computer, special purpose computer, or special purpose processing device to perform a certain function or group of functions. In some embodiments, computer-executable instructions are executed on a general-purpose computer to turn the general purpose computer into a special purpose computer implementing elements of the disclosure. The computer executable instructions may be, for example, binaries, intermediate format instructions such as assembly language, or even source code. Although the subject matter has been described in language specific to structural features and/or methodological acts, it is to be understood that the subject matter defined in the appended claims is not necessarily limited to the described features or acts described above. Rather, the described features and acts are disclosed as example forms of implementing the claims.

Those skilled in the art will appreciate that the disclosure may be practiced in network computing environments with many types of computer system configurations, including, personal computers, desktop computers, laptop computers, message processors, hand-held devices, multi-processor systems, microprocessor-based or programmable consumer electronics, network PCs, minicomputers, mainframe computers, mobile telephones, PDAs, tablets, pagers, routers, switches, and the like. The disclosure may also be practiced in distributed system environments where local and remote computer systems, which are linked (either by hardwired data links, wireless data links, or by a combination of hardwired and wireless data links) through a network, both perform tasks. In a distributed system environment, program modules may be located in both local and remote memory storage devices.

Embodiments of the present disclosure can also be implemented in cloud computing environments. In this description, "cloud computing" is defined as a model for enabling on-demand network access to a shared pool of configurable computing resources. For example, cloud computing can be employed in the marketplace to offer ubiquitous and convenient on-demand access to the shared pool of configurable computing resources. The shared pool of configurable computing resources can be rapidly provisioned via virtualization and released with low management effort or service provider interaction, and then scaled accordingly.

A cloud-computing model can be composed of various characteristics such as, for example, on-demand self-service, broad network access, resource pooling, rapid elasticity, measured service, and so forth. A cloud-computing model can also expose various service models, such as, for example, Software as a Service ("SaaS"), Platform as a Service ("PaaS"), and Infrastructure as a Service ("IaaS"). A cloud-computing model can also be deployed using different deployment models such as private cloud, community cloud, public cloud, hybrid cloud, and so forth. In this description and in the claims, a "cloud-computing environment" is an environment in which cloud computing is employed.

Figure 10:
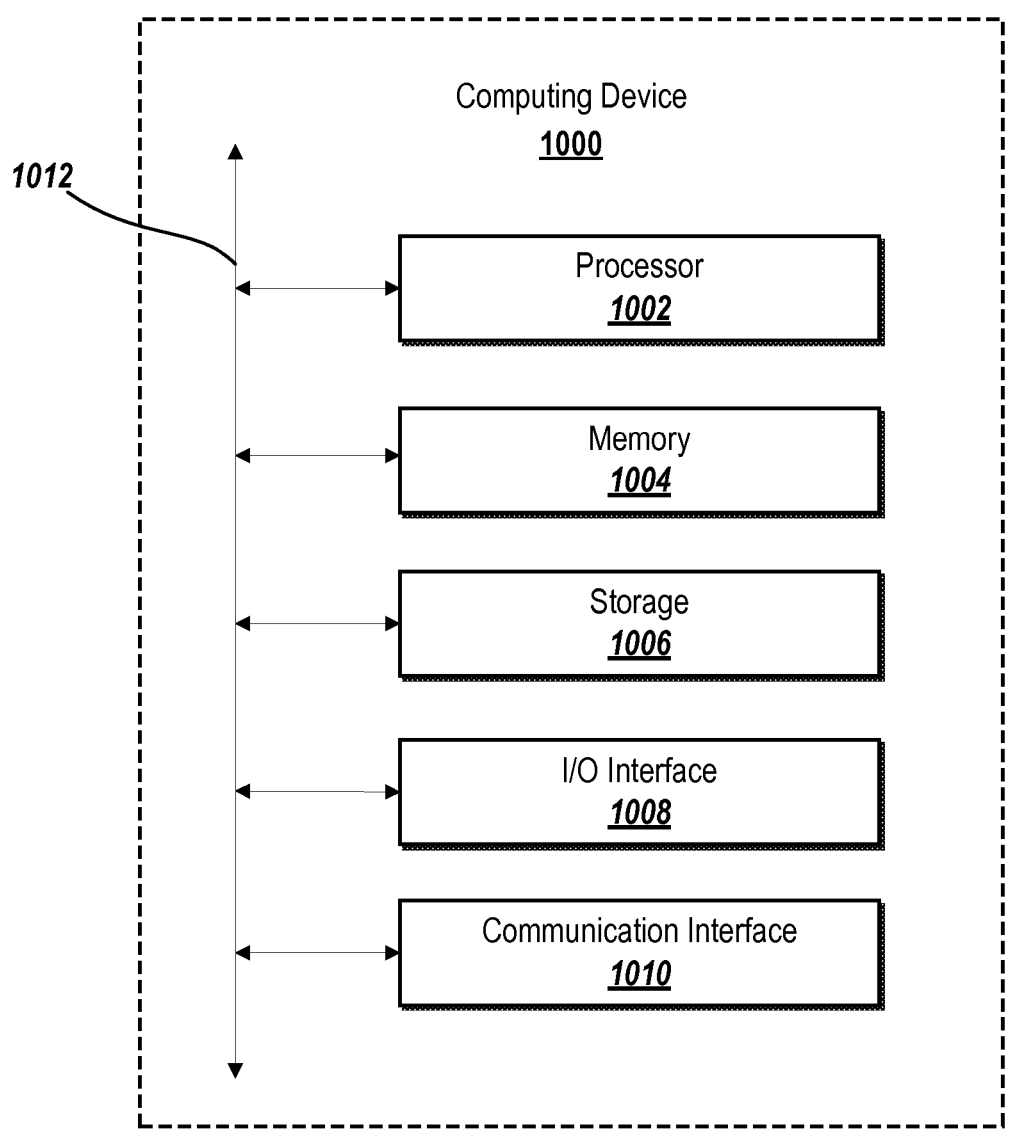
FIG. 10 illustrates a block diagram of an exemplary computing device in accordance with one or more embodiments.

FIG. 10 illustrates a block diagram of an exemplary computing device 1000 that may be configured to perform one or more of the processes described above. One will appreciate that the policy selection system may be implemented by one or more computing devices such as the computing device 1000. As shown by FIG. 10, the computing device 1000 can comprise a processor 1002, memory 1004, a storage device 1006, an I/O interface 1008, and a communication interface 1010, which may be communicatively coupled by way of a communication infrastructure 1012. While an exemplary computing device 1000 is shown in FIG. 10, the components illustrated in FIG. 10 are not intended to be limiting. Additional or alternative components may be used in other embodiments. Furthermore, in certain embodiments, the computing device 1000 can include fewer components than those shown in FIG. 10. Components of the computing device 1000 shown in FIG. 10 will now be described in additional detail.

In particular embodiments, the processor 1002 includes hardware for executing instructions, such as those making up a computer program. As an example and not by way of limitation, to execute instructions, the processor 1002 may retrieve (or fetch) the instructions from an internal register, an internal cache, the memory 1004, or the storage device 1006 and decode and execute them. In particular embodiments, the processor 1002 may include one or more internal caches for data, instructions, or addresses. As an example and not by way of limitation, the processor 1002 may include one or more instruction caches, one or more data caches, and one or more translation lookaside buffers (TLBs). Instructions in the instruction caches may be copies of instructions in the memory 1004 or the storage 1006.

The memory 1004 may be used for storing data, metadata, and programs for execution by the processor(s). The memory 1004 may include one or more of volatile and non-volatile memories, such as Random Access Memory ("RAM"), Read Only Memory ("ROM"), a solid state disk ("SSD"), Flash, Phase Change Memory ("PCM"), or other types of data storage. The memory 1004 may be internal or distributed memory.

The storage device 1006 includes storage for storing data or instructions. As an example and not by way of limitation, the storage device 1006 can comprise a non-transitory storage medium described above. The storage device 1006 may include a hard disk drive (HDD), a floppy disk drive, flash memory, an optical disc, a magneto-optical disc, magnetic tape, or a Universal Serial Bus (USB) drive or a combination of two or more of these. The storage device 1006 may include removable or non-removable (or fixed) media, where appropriate. The storage device 1006 may be internal or external to the computing device 1000. In particular embodiments, the storage device 1006 is non-volatile, solid-state memory. In other embodiments, the storage device 1006 includes read-only memory (ROM). Where appropriate, this ROM may be mask programmed ROM, programmable ROM (PROM), erasable PROM (EPROM), electrically erasable PROM (EEPROM), electrically alterable ROM (EAROM), or flash memory or a combination of two or more of these.

The I/O interface 1008 allows a user to provide input to, receive output from, and otherwise transfer data to and receive data from the computing device 1000. The I/O interface 1008 may include a mouse, a keypad or a keyboard, a touch screen, a camera, an optical scanner, network interface, modem, other known I/O devices or a combination of such I/O interfaces. The I/O interface 1008 may include one or more devices for presenting output to a user, including, but not limited to, a graphics engine, a display (e.g., a display screen), one or more output drivers (e.g., display drivers), one or more audio speakers, and one or more audio drivers. In certain embodiments, the I/O interface 1008 is configured to provide graphical data to a display for presentation to a user. The graphical data may be representative of one or more graphical user interfaces and/or any other graphical content as may serve a particular implementation.

The communication interface 1010 can include hardware, software, or both. In any event, the communication interface 1010 can provide one or more interfaces for communication (such as, for example, packet-based communication) between the computing device 1000 and one or more other computing devices or networks. As an example and not by way of limitation, the communication interface 1010 may include a network interface controller (NIC) or network adapter for communicating with an Ethernet or other wire-based network or a wireless NIC (WNIC) or wireless adapter for communicating with a wireless network, such as a WI-FI.

Additionally or alternatively, the communication interface 1010 may facilitate communications with an ad hoc network, a personal area network (PAN), a local area network (LAN), a wide area network (WAN), a metropolitan area network (MAN), or one or more portions of the Internet or a combination of two or more of these. One or more portions of one or more of these networks may be wired or wireless. As an example, the communication interface 1010 may facilitate communications with a wireless PAN (WPAN) (such as, for example, a BLUETOOTH WPAN), a WI-FI network, a WI-MAX network, a cellular telephone network (such as, for example, a Global System for Mobile Communications (GSM) network), or other suitable wireless network or a combination thereof.

Additionally, the communication interface 1010 may facilitate communications various communication protocols. Examples of communication protocols that may be used include, but are not limited to, data transmission media, communications devices, Transmission Control Protocol ("TCP"), Internet Protocol ("IP"), File Transfer Protocol ("FTP"), Telnet, Hypertext Transfer Protocol ("HTTP"), Hypertext Transfer Protocol Secure ("HTTPS"), Session Initiation Protocol ("SIP"), Simple Object Access Protocol ("SOAP"), Extensible Mark-up Language ("XML") and variations thereof, Simple Mail Transfer Protocol ("SMTP"), Real-Time Transport Protocol ("RTP"), User Datagram Protocol ("UDP"), Global System for Mobile Communications ("GSM") technologies, Code Division Multiple Access ("CDMA") technologies, Time Division Multiple Access ("TDMA") technologies, Short Message Service ("SMS"), Multimedia Message Service ("MMS"), radio frequency ("RF") signaling technologies, Long Term Evolution ("LTE") technologies, wireless communication technologies, in-band and out-of-band signaling technologies, and other suitable communications networks and technologies.

The communication infrastructure 1012 may include hardware, software, or both that couples components of the computing device 1000 to each other. As an example and not by way of limitation, the communication infrastructure 1012 may include an Accelerated Graphics Port (AGP) or other graphics bus, an Enhanced Industry Standard Architecture (EISA) bus, a front-side bus (FSB), a HYPERTRANSPORT (HT) interconnect, an Industry Standard Architecture (ISA) bus, an INFINIBAND interconnect, a low-pin-count (LPC) bus, a memory bus, a Micro Channel Architecture (MCA) bus, a Peripheral Component Interconnect (PCI) bus, a PCI-Express (PCIe) bus, a serial advanced technology attachment (SATA) bus, a Video Electronics Standards Association local (VLB) bus, or another suitable bus or a combination thereof.

In the foregoing specification, the present disclosure has been described with reference to specific exemplary embodiments thereof. Various embodiments and aspects of the present disclosure(s) are described with reference to details discussed herein, and the accompanying drawings illustrate the various embodiments. The description above and drawings are illustrative of the disclosure and are not to be construed as limiting the disclosure. Numerous specific details are described to provide a thorough understanding of various embodiments of the present disclosure.

The present disclosure may be embodied in other specific forms without departing from its spirit or essential characteristics. The described embodiments are to be considered in all respects only as illustrative and not restrictive. For example, the methods described herein may be performed with less or more steps/acts or the steps/acts may be performed in differing orders. Additionally, the steps/acts described herein may be repeated or performed in parallel with one another or in parallel with different instances of the same or similar steps/acts. The scope of the present application is, therefore, indicated by the appended claims rather than by the foregoing description. All changes that come within the meaning and range of equivalency of the claims are to be embraced within their scope.

We claim:

1. In a digital medium environment for identifying and deploying digital advertising campaigns across a plurality of client devices, where campaigns can be altered, removed, or replaced on demand, a computer-implemented method of using risk-sensitive, lifetime value optimization based on a conditional value at risk measure to improve accuracy, efficiency, and stability in selecting and executing ad recommendation policies comprising:
   identifying, at a server, a risk-tolerance value indicating a measure of permissible variance for ad recommendation policies in a digital content campaign, the risk-tolerance value corresponding to a conditional value at risk;
   identifying a set of user data indicating prior interactions by user client devices in relation to digital advertisements of one or more digital content campaigns;
   determining, by the server, an optimized ad recommendation policy subject to the risk-tolerance value by converging a policy parameter and a risk parameter, the risk parameter indicating policy conditional value at risk, to identify the optimized ad recommendation policy such that the optimized ad recommendation policy satisfies the conditional value at risk by:
      determining a gradient for the policy parameter by sampling the set of user data;
      determining a gradient for the risk parameter by sampling the set of user data;
      using the determined gradient for the risk parameter to select an updated risk parameter that indicates updated policy conditional value at risk; and
      using the determined gradient for the policy parameter to identify an updated policy parameter; and
   in response to determining the optimized ad recommendation policy, executing the digital content campaign subject to the risk-tolerance value corresponding to the conditional value at risk by providing digital advertisements to client devices in accordance with the optimized ad recommendation policy.

2. The method as recited in claim 1, wherein determining, by the server, the optimized ad recommendation policy subject to the risk-tolerance value comprises converging the policy parameter, the risk parameter, and a constraint parameter to identify the optimized ad recommendation policy that is subject to the risk-tolerance value by:
   determining a gradient for the constraint parameter by sampling the set of user data; and
   using the determined gradient for the constraint parameter to select an updated constraint parameter.

3. The method as recited in claim 2, wherein converging the policy parameter, the risk parameter, and the constraint parameter comprises identifying the updated risk parameter according to a first time scale, identifying the updated policy parameter according to a second time scale, and identifying the updated constraint parameter according to a third time scale.

4. The method as recited in claim 3, wherein:
   the first time scale is faster than the second time scale; and
   the second time scale is faster than the third time scale.

5. The method as recited in claim 1, wherein determining the gradient for the policy parameter by sampling the set of user data comprises generating one or more trajectories by following the policy parameter during sampling and using the one or more trajectories to determine the gradient for the policy parameter.

6. The method as recited in claim 1, wherein:
   the conditional value at risk comprises a threshold measure of a mean of an alpha-tail distribution; and
   determining the optimized ad recommendation policy subject to the risk-tolerance value comprises converging the policy parameter and the risk parameter such that an alpha-tail distribution corresponding to the optimized ad recommendation policy satisfies the threshold measure of the mean of the alpha-tail distribution.

7. The method as recited in claim 6, further comprising:
   receiving a confidence level for the risk-tolerance value;
   determining the threshold measure of the mean of the alpha-tail distribution based on the risk-tolerance value and the confidence level; and
   determining that the optimized ad recommendation policy satisfies the risk-tolerance value and the confidence level by determining that the optimized ad recommendation policy satisfies the threshold measure of the mean of the alpha-tail distribution.

8. The method as recited in claim 1, further comprising:
   selecting the policy parameter from a set of ad recommendation policies; and
   selecting the updated risk parameter from the set of ad recommendation policies.

9. The method as recited in claim 3, further comprising applying projection operators when determining gradients for the risk parameter, the policy parameter, and the constraint parameter to ensure convergence to the optimal ad recommendation policy.

10. The method as recited in claim 1, wherein the risk-tolerance value comprises a threshold click-thru rate.

11. The method as recited in claim 1, wherein the optimized ad recommendation policy returns an advertisement to present on a webpage to a user with a given set of characteristics.

12. The method as recited in claim 1, wherein the optimized ad recommendation policy projects a click-thru rate less than an ad recommendation policy optimized for lifetime value without regard to risk.

13. In a digital medium environment for identifying and deploying policies, where policies can be altered, removed, or replaced on demand, a method of using risk-sensitive, lifetime value optimization based on a conditional value at risk measure to improve accuracy, efficiency, and stability in selecting and executing a policy comprising:

identifying, by one or more processors, a risk-tolerance value indicating a measure of permissible variance for policies and a confidence level, the risk-tolerance value and the confidence level corresponding to a conditional value at risk indicating a threshold measure of a mean of an alpha-tail distribution;

identifying a set of sample data comprising prior interactions by user client devices;

receiving a set of policies, each policy being defined by one or more policy parameters; and determining, by the one or more processors, an optimized policy that is subject to the risk-tolerance value within the confidence level using a trajectory-based policy gradient algorithm by converging a policy parameter, a risk parameter indicating policy conditional value at risk, and a constraint parameter by sampling the sample data to identify the optimized policy that satisfies the threshold measure of the mean of the alpha-tail distribution; and in response to determining the optimized policy, executing the optimized policy subject to the risk-tolerance value and the confidence level corresponding to the conditional value at risk such that digital content is provided to client devices in accordance with the optimized policy.

14. The method as recited in claim 13, wherein determining, by the one or more processors, the optimized policy that is subject to the risk-tolerance value within the confidence level using the trajectory-based policy gradient algorithm comprises, for each of the policy parameter, the risk parameter, and the constraint parameter repeatedly:

generating one or more trajectories of a given parameter of the policy parameter, the risk parameter, or the constraint parameter by sampling the set of sample data;

estimating, by the one or more processors, a gradient for the given parameter based on the generated one or more trajectories of the given parameter; and using the estimated gradient for the given parameter to update the given parameter.

15. The method as recited in claim 14, further comprising applying projection operators when estimating gradients for the risk parameter, the policy parameter, and the constraint parameter to ensure convergence to the optimized policy that satisfies the threshold measure of the mean of the alpha-tail distribution.

16. The method as recited in claim 13, wherein converging the policy parameter, the risk parameter, and the constraint parameter comprises updating the risk parameter at a first time scale, updating the policy parameter at a second time scale, and updating the constraint parameter at a third time scale.

17. The method as recited in claim 16, wherein:
the first time scale is faster than the second time scale; and
the second time scale is faster than the third time scale.

18. The method as recited in claim 13, wherein determining, by the one or more processors, the optimized policy that is subject to the risk-tolerance value within the confidence level using the trajectory-based policy gradient algorithm comprises solving an optimization of a policy conditional value-at risk for a Markov decision process subject to the conditional value at risk indicating the threshold measure of the mean of the alpha-tail distribution.

19. A system using risk-sensitive, lifetime value optimization based on a conditional value at risk measure to improve accuracy, efficiency, and stability in selecting ad recommendation policies in connection with identifying and deploying digital advertising campaigns, where campaigns can be altered, removed, or replaced on demand, comprising:

at least one processor;

at least one non-transitory computer readable storage medium storing instructions thereon, that, when executed by the at least one processor, cause the system to:

receive a risk-tolerance value and a confidence level for the risk-tolerance value, the risk-tolerance value and confidence level corresponding to a conditional value at risk;

identify a set of user data indicating prior interactions by user client devices in relation to digital advertisements of one or more digital content campaigns;

determine an optimized ad recommendation policy that is subject to the risk-tolerance value within the confidence level by converging a policy parameter, a risk parameter indicating policy conditional value at risk, and a constraint parameter to identify the optimized ad recommendation policy such that the optimized ad recommendation policy satisfies the conditional value at risk by repeatedly, for each of the policy parameter, the risk parameter, and the constraint parameter:

estimating a gradient for a given parameter of the policy parameter, the risk parameter, or the constraint parameter based on sampling of the set of user data with respect to an initial ad recommendation policy; and using the estimated gradient for the given parameter to update the given parameter; and in response to determining the optimized ad recommendation policy, execute the digital content campaign subject to the risk-tolerance value and the confidence level corresponding to the conditional value at risk by providing digital advertisements to client devices in accordance with the optimized ad recommendation policy.

20. The system as recited in claim 19, wherein estimating the gradient for the given parameter of the policy parameter, the risk parameter indicating policy conditional value at risk, or the constraint parameter based on sampling of the set of user data with respect to the initial ad recommendation policy comprises:

generating one or more trajectories of the given parameter by sampling the set of sample data; and using the generated one or more trajectories of the given parameter to estimate the gradient for the given parameter.

* * * * *